United States Patent
Sprenger et al.

(10) Patent No.: US 10,341,732 B2
(45) Date of Patent: Jul. 2, 2019

(54) VIDEO QUALITY OPTIMIZATION BASED ON DISPLAY CAPABILITIES

(71) Applicant: CenturyLink Intellectual Property LLC, Denver, CO (US)

(72) Inventors: Michael D. Sprenger, Boulder, CO (US); Zubin Ingah, Centennial, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 0 days.

(21) Appl. No.: 15/477,356

(22) Filed: Apr. 3, 2017

(65) Prior Publication Data

US 2018/0084305 A1     Mar. 22, 2018

Related U.S. Application Data

(60) Provisional application No. 62/395,507, filed on Sep. 16, 2016.

(51) Int. Cl.
| | |
|---|---|
| *H04N 21/472* | (2011.01) |
| *H04N 21/482* | (2011.01) |
| *H04N 21/433* | (2011.01) |
| *H04N 21/4402* | (2011.01) |
| *H04N 21/24* | (2011.01) |

(52) U.S. Cl.
CPC ... *H04N 21/47217* (2013.01); *H04N 21/2402* (2013.01); *H04N 21/433* (2013.01); *H04N 21/44029* (2013.01); *H04N 21/482* (2013.01)

(58) Field of Classification Search
CPC .......... H04N 21/47217; H04N 21/482; H04N 21/433; H04N 21/44029
See application file for complete search history.

(56) References Cited

U.S. PATENT DOCUMENTS

| | | | |
|---|---|---|---|
| 2005/0160468 A1* | 7/2005 | Rodriguez | G06F 3/14 725/109 |
| 2012/0054664 A1* | 3/2012 | Dougall | H04N 21/23439 715/772 |
| 2013/0283029 A1* | 10/2013 | Terada | H04N 21/4122 713/100 |
| 2015/0341611 A1* | 11/2015 | Oh | H04N 9/8722 386/230 |

\* cited by examiner

*Primary Examiner* — Yassin Alata

(57) ABSTRACT

Novel tools and techniques are provided for implementing media content streaming/downloading and playback, and, more particularly, to methods, systems, and apparatuses for implementing video quality optimization based on display capabilities. In various embodiments, a computing system might receive user input from a user indicating a user request for media content. The computing system might autonomously determine characteristics or attributes of a playback device (i.e., a display device and/or audio playback device, etc.). The computing system might send, to a media content source over a network, a request for the media content, the request comprising information regarding presentation characteristics that are based at least in part on the determined characteristics of the playback device. The computing system might receive a version of the media content having the one or more presentation characteristics, and might relay the received version of the media content to the playback device for presentation to the user.

27 Claims, 12 Drawing Sheets

VIDEO QUALITY OPTIMIZATION BASED ON DISPLAY CAPABILITIES

CROSS-REFERENCES TO RELATED APPLICATIONS

This application claims priority to U.S. Patent Application Ser. No. 62/395,507 (the "'507 Application"), filed Sep. 16, 2016 by Michael D. Sprenger et al., entitled, "Video Quality Optimization Based on Display Capabilities," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or downloading and media content playback, and, more particularly, to methods, systems, and apparatuses for implementing video quality optimization based on display capabilities.

BACKGROUND

Conventional set-top boxes ("STBs") or media players are unable to determine the display capabilities of display devices connected therewith. Although emerging streaming video systems or the like now allow consumers or users to select specific content with attributes such as 4K or high dynamic range ("HDR") or the like, some consumers or users may not be aware of the specific capabilities of their TV(s) and/or may not know how to request content in a format that takes full advantage of their TVs capabilities. Alternatively, or additionally, some consumers or users may request a format that cannot be displayed by their TV (and would get down-sampled or down-decimated), thus unnecessarily using bandwidth in the operator's or service provider's network. For example, consumers or users might select 4K content with HDR, but the user's display devices (e.g., TV) might only be a high definition ("HD") TV that is not capable of displaying content in 4K with HDR. In such instances, the STB or media player through which the user makes the selection, or the HDTV itself, might receive the 4K content and might down-sample the 4K content into HD content that can be displayed. This process, however, results in excessive bandwidth usage (i.e., downloading of 4K content that will not actually be viewed in the form as downloaded, the 4K content being generally larger in data size).

Hence, there is a need for more robust and scalable solutions for implementing media content streaming or downloading and media content playback, and, more particularly, to methods, systems, and apparatuses for implementing video quality optimization based on display capabilities.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
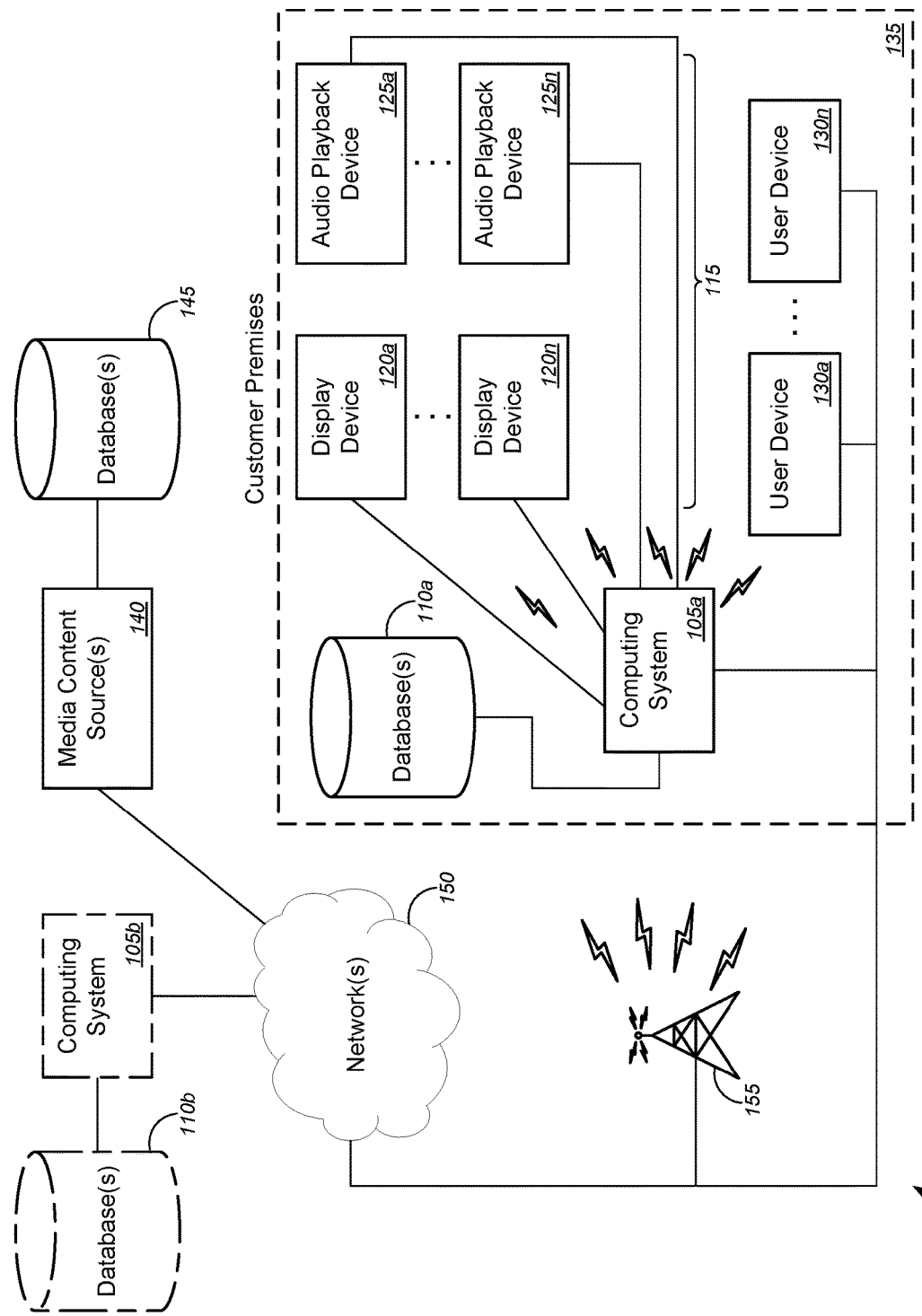
FIG. 1 is a schematic diagram illustrating a system for implementing video quality optimization based on display capabilities, in accordance with various embodiments.

Various embodiments provide tools and techniques for implementing media content streaming or downloading and media content playback, and, more particularly, to methods, systems, and apparatuses for implementing video quality optimization based on display capabilities.

Merely by way of example, the embodiments described herein are directed to video quality optimization based on display capabilities, however, the various embodiments are not limited to video services, and can similarly apply to audio quality optimization based on audio capabilities, game play quality optimization based on display and audio capabilities, image quality optimization based on display capabilities, and/or the like.

In various embodiments, a computing system (which might be a set-top box ("STB"), a media player, or some other similar device) might receive a first user input from a user indicating a user request for a first media content. The computing system might autonomously determine one or more first characteristics of a first playback device (i.e., at least one of one or more display devices or one or more audio playback devices, or the like). The computing system might subsequently send, to a media content source over a network, a first request for the first media content, the first request comprising information regarding one or more first presentation characteristics that are based at least in part on the determined one or more first characteristics of the first playback device. The computing system might receive a first version of the first media content, the first version of the first media content having the one or more first presentation characteristics, and might relay the received first version of the first media content to the first playback device for presentation to the user of the first version of the first media content.

Merely by way of example, according to some embodiments, the one or more first characteristics might comprise at least one of video resolution, dynamic range, frame rate, or color gamut, and/or the like. In some cases, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like. In this context, the term "standard color gamut or SCG" might refer to color spaces used for standard definition television ("SDTV") or high definition TV ("HDTV") formats, including ITU-R Recommendation BT.601 (or Rec.601), ITU-R Recommendation BT.709 (or Rec.709), and/or the like. The term "wide color gamut or WCG" might refer to color spaces exceeding the color gamut BT.601 and BT.709, such as ITU-R Recommendation BT.2020 (or Rec. 2020), DCI-P3, and/or any other color space that may be standardized in the future.

Network operators, Internet service providers ("ISPs"), and providers of streaming video services need to balance bandwidth usage in their networks and carefully weigh product offerings, bandwidth demand, and content variety. Transporting video signals to a media player or STB of an individual subscriber or user whose display device is not capable of displaying certain aspects such as 4K resolution, High Dynamic Range ("HDR"), High Frame Rate ("HFR"), Wide Color Gamut ("WCG"), and/or the like unnecessarily utilizes bandwidth in the operator's or service provider's network. To optimize network capacity usage and maximize bandwidth utilization, it is desirable to only feed content to a subscriber at a quality level (resolution, HDR/HFR/WCG) that the end display device is able to handle and to display to the consumer.

The various embodiments comprise a STB, media player, or similar kind of replay mechanism that is able to obtain information about the capabilities of the attached TV or other display and—if needed—cache it locally in non-volatile memory. Such information includes, but is not limited to, resolution, dynamic range capability, frame rate capability, color space representation, and/or the like. The system is able to automatically select content in a format whose quality best matches the capabilities of the attached display (in terms of resolution, dynamic range, frame rate, color reproduction, and/or the like). This has the added benefit that the media content having the particular attributes or characteristics displayable by the display device(s) (rather than media content having attributes or characteristics beyond the capabilities of the display device(s)) is downloaded, thereby avoiding unnecessary or excess bandwidth usage (i.e., avoiding downloading of content of too high a quality, which is larger in data size, that will have to be down-sampled or down-decimated anyway in order to be displayed on the display device(s)).

For example, if the user's display device has 4K resolution, the STB or media player will request a 4K version of the selected content from the operator's or service provider's playout source or from the media content source(s). If the user's TV has HD resolution, then streaming 4K content does not make sense, as it would get down-sampled in the STB, media player, or the TV. This approach significantly reduces bandwidth usage in the operator's or service provider's network and guarantees that the user always receives a highest quality video feed, most closely matching the display's capabilities.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, media content optimization technology, network utilization technology, network optimization technology, and/or the like. In other aspects, certain embodiments, can improve the functioning of user equipment or systems themselves (e.g., media players, set-top boxes ("STBs"), media content streaming or downloading systems, etc.), for example, by autonomously determining one or more characteristics or attributes of a playback device (e.g., resolution, frame rate, dynamic range, and/or color gamut, or the like for a display device, and/or the like), sending a request for user selected media content that has presentation characteristic that are based on or consistent with the determined one or more characteristics or attributes of the playback device, and/or the like. In particular, to the extent any abstract concepts are present in the various embodiments, those concepts can be implemented as described herein by devices, software, systems, and methods that involve specific novel functionality (e.g., steps or operations), such as autonomously determining one or more characteristics or attributes of a playback device (e.g., resolution, frame rate, dynamic range, and/or color gamut, or the like for a display device, and/or the like), sending a request for user selected media content that has presentation characteristic that are based on or consistent with the determined one or more characteristics or attributes of the playback device, and/or the like, which optimizes presentation of the media content consistent with the capabilities of the user's playback device(s) while not needlessly wasting network bandwidth, and/or the like, to name a few examples, that extend beyond mere conventional computer processing operations. These functionalities can produce tangible results outside of the implementing computer system, including, merely by way of example, optimized presentation of media content to the user consistent with the capabilities of the user's playback device(s), avoidance of network bandwidth usage (i.e., by avoiding downloading of media content having attributes that are beyond the capabilities of the user's playback device(s), etc.), and/or the like, at least some of which may be observed or measured by customers and/or service providers.

In an aspect, a method might comprise receiving, with a computing system, a first user input from a user indicating a user request for a first media content; autonomously determining, with the computing system, one or more first characteristics of a plurality of characteristics of a first playback device; and sending, with the computing system and to a media content source over a network, a first request for the first media content, the first request comprising information regarding one or more first presentation characteristics that are based at least in part on the determined one or more first characteristics of the first playback device. The method might further comprise receiving, with the computing system, a first version of the first media content, the first version of the first media content having the one or more first presentation characteristics; and relaying, with the computing system, the received first version of the first media content to the first playback device for presentation to the user of the first version of the first media content.

In some embodiments, the computing system might comprise a media device that is communicatively coupled to the first playback device. In some cases, the media device might comprise one of a set-top box ("STB"), a media player, a gaming console, a server computer, a desktop computer, or a laptop computer, and/or the like. The media player, in some instances, might comprise one of a digital versatile disc or digital video disc ("DVD") player, a Blu-ray disc ("BD") player, a streaming video player, a streaming music player, or a streaming game player, and/or the like. The first playback device might comprise at least one of one or more monitors, one or more television sets, or one or more speakers, and/or the like. Alternatively, the computing system and the first playback device might be integrated within a single device, the single device comprising one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

According to some embodiments, the one or more first characteristics might comprise at least one of video resolution, dynamic range, frame rate, or color gamut, and/or the like. In some instances, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

Merely by way of example, in some cases, the method might further comprise autonomously determining, with the computing system, one or more second characteristics of the plurality of characteristics of the first playback device, the one or more second characteristics comprising at least one of device manufacturer, model number, or specific firmware revision information. In such cases, the information regarding the one or more first presentation characteristics comprised in the first request might be based at least in part on a combination of the determined one or more first characteristics of the first playback device and the determined one or more second characteristics of the first playback device.

In some embodiments, the method might further comprise storing, with the computing system, the determined one or more first characteristics of the first playback device on a local data storage device; receiving, with the computing system, a second user input from the user indicating a user request for a second media content; autonomously determining, with the computing system, whether the first playback device has been disconnected since its most recent usage; and based on a determination that the first playback device has been disconnected since its most recent usage and based on a determination that a second playback device has been connected, determining, with the computing system, whether the second playback device and the first playback device are the same device.

Based on a determination that the second playback device and the first playback device are the same device, the method might further comprise retrieving, with the computing system, the determined one or more first characteristics of the first playback device from the local data storage device; sending, with the computing system and to the media content source over the network, a second request for the second media content, the second request comprising information regarding one or more first presentation characteristics that are based at least in part on the determined one or more first characteristics of the first playback device; receiving, with the computing system, a second version of the second media content, the second version of the second media content having the one or more first presentation characteristics; and relaying, with the computing system, the received second version of the second media content to the first playback device for presentation to the user of the second version of the second media content.

Based on a determination that the second playback device and the first playback device are different devices, the method might further comprise determining, with the computing system, whether one or more characteristics of the second playback device are already stored on the local data storage device. Based on a determination that one or more third characteristics of the second playback device are already stored on the local data storage device, the method might further comprise retrieving, with the computing system, the determined one or more third characteristics of the second playback device from the local data storage device; sending, with the computing system and to the media content source over the network, a third request for the second media content, the third request comprising information regarding one or more second presentation characteristics that are based at least in part on the determined one or more third characteristics of the second playback device; receiving, with the computing system, a third version of the second media content, the third version of the second media content having the one or more second presentation characteristics; and relaying, with the computing system, the received third version of the second media content to the second playback device for presentation to the user of the third version of the second media content.

Based on a determination that characteristics of the second playback device are not already stored on the local data storage device, the method might further comprise autonomously determining, with the computing system, one or more fourth characteristics of the second playback device; sending, with the computing system and to the media content source over the network, a fourth request for the second media content, the fourth request comprising information regarding one or more third presentation characteristics that are based at least in part on the determined one or more fourth characteristics of the second playback device; receiving, with the computing system, a fourth version of the second media content, the fourth version of the second media content having the one or more third presentation characteristics; and relaying, with the computing system, the received fourth version of the second media content to the second playback device for presentation to the user of the fourth version of the second media content.

According to some embodiments, the second media content and the first media content are the same media content, and the first playback device had been disconnected prior to presentation to the user of the entirety of the first media content. In some embodiments, autonomously determining the one or more first characteristics of the first playback device might comprise autonomously determining, with the computing system, the one or more first characteristics of the plurality of characteristics of the first playback device from the first playback device via an interface device between the computing system and the first playback device.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive a first user input from a user indicating a user request for a first media content; autonomously determine one or more first characteristics of a plurality of characteristics of a first playback device; send, to a media content source over a network, a first request for the first media content, the first request comprising information regarding one or more first presentation characteristics that are based at least in part on the determined one or more first characteristics of the first playback device; receive a first version of the first media content, the first version of the first media content having the one or more first presentation characteristics; and relay the received first version of the first media content to the first playback device for presentation to the user of the first version of the first media content.

According to some embodiments, the apparatus might comprise a media device that is communicatively coupled to the first playback device. In some cases, the media device might comprise one of a set-top box ("STB"), a media player, a gaming console, a server computer, a desktop computer, or a laptop computer, and/or the like. The media player, in some instances, might comprise one of a digital versatile disc or digital video disc ("DVD") player, a Blu-ray disc ("BD") player, a streaming video player, a streaming music player, or a streaming game player, and/or the like. The first playback device might comprise at least one of one or more monitors, one or more television sets, or one or more speakers, and/or the like. Alternatively, the apparatus might comprise the playback device, the apparatus comprising one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

In some embodiments, the one or more first characteristics might comprise at least one of video resolution, dynamic range, frame rate, or color gamut, and/or the like. In some instances, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

Merely by way of example, in some cases, the set of instructions, when executed by the at least one processor, further causes the apparatus to: autonomously determine one or more second characteristics of the plurality of characteristics of the first playback device, the one or more second characteristics comprising at least one of device manufacturer, model number, or specific firmware revision information, wherein the information regarding the one or more first presentation characteristics comprised in the first request is based at least in part on a combination of the determined one or more first characteristics of the first playback device and the determined one or more second characteristics of the first playback device.

In some embodiments, the set of instructions, when executed by the at least one processor, further causes the apparatus to: store the determined one or more first characteristics of the first playback device on a local data storage device; receive a second user input from the user indicating a user request for a second media content; autonomously determine whether the first playback device has been disconnected since its most recent usage; based on a determination that the first playback device has been disconnected since its most recent usage and based on a determination that a second playback device has been connected, determine whether the second playback device and the first playback device are the same device; and based on a determination that the second playback device and the first playback device are the same device: retrieve the determined one or more first characteristics of the first playback device from the local data storage device; send, to the media content source over the network, a second request for the second media content, the second request comprising information regarding one or more first presentation characteristics that are based at least in part on the determined one or more first characteristics of the first playback device; receive a second version of the second media content, the second version of the second media content having the one or more first presentation characteristics; and relay the received second version of the second media content to the first playback device for presentation to the user of the second version of the second media content.

According to some embodiments, the set of instructions, when executed by the at least one processor, further causes the apparatus to: based on a determination that the second playback device and the first playback device are different devices, determine whether one or more characteristics of the second playback device are already stored on the local data storage device; and based on a determination that one or more third characteristics of the second playback device are already stored on the local data storage device: retrieve the determined one or more third characteristics of the second playback device from the local data storage device; send, to the media content source over the network, a third request for the second media content, the third request comprising information regarding one or more second presentation characteristics that are based at least in part on the determined one or more third characteristics of the second playback device; receive a third version of the second media content, the third version of the second media content having the one or more second presentation characteristics; and relay the received third version of the second media content to the second playback device for presentation to the user of the third version of the second media content.

In some embodiments, the set of instructions, when executed by the at least one processor, further causes the apparatus to: based on a determination that characteristics of the second playback device are not already stored on the local data storage device: autonomously determine one or more fourth characteristics of the second playback device; send, to the media content source over the network, a fourth request for the second media content, the fourth request comprising information regarding one or more third presentation characteristics that are based at least in part on the determined one or more fourth characteristics of the second playback device; receive a fourth version of the second media content, the fourth version of the second media content having the one or more third presentation characteristics; and relay the received fourth version of the second media content to the second playback device for presentation to the user of the fourth version of the second media content.

According to some embodiments, the second media content and the first media content are the same media content, and the first playback device had been disconnected prior to presentation to the user of the entirety of the first media content.

In yet another aspect, a system might comprise a computing system and a first playback device. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a first user input from a user indicating a user request for a first media content; autonomously determine one or more first characteristics of a plurality of characteristics of a first playback device; send, to a media content source over a network, a first request for the first media content, the first request comprising information regarding one or more first presentation characteristics that are based at least in part on the determined one or more first characteristics of the first playback device; receive a first version of the first media content, the first version of the first media content having the one or more first presentation characteristics; and relay the received first version of the first media content to the first playback device for presentation to the user of the first version of the first media content.

The first playback device might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the first playback device to: receive the first version of the first media content relayed from the computing system; and present the first version of the first media content to the user.

In some embodiments, the computing system might comprise a media device that is communicatively coupled to the first playback device. The media device might comprise one of a set-top box ("STB"), a media player, a gaming console, a server computer, a desktop computer, or a laptop computer, and/or the like. The media player might comprise one of a digital versatile disc or digital video disc ("DVD") player, a Blu-ray disc ("BD") player, a streaming video player, a streaming music player, or a streaming game player, and/or the like. The first playback device might comprise at least one of one or more monitors, one or more television sets, or one or more speakers, and/or the like. Alternatively, the computing system and the first playback device might be integrated within a single device, the single device comprising one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

According to some embodiments, the one or more first characteristics might comprise at least one of video resolution, dynamic range, frame rate, or color gamut, and/or the like. In some instances, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

In some embodiments, autonomously determining the one or more first characteristics of the first playback device might comprise autonomously determining, with the computing system, the one or more first characteristics of the plurality of characteristics of the first playback device from the first playback device via an interface device between the computing system and the first playback device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

SPECIFIC EXEMPLARY EMBODIMENTS

We now turn to the embodiments as illustrated by the drawings. FIGS. 1-6 illustrate some of the features of the method, system, and apparatus for implementing media content streaming or downloading and media content playback, and, more particularly, to methods, systems, and apparatuses for implementing video quality optimization based on display capabilities, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing video quality optimization based on display capabilities, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise one or more playback devices 115, which might include, without limitation, at least one of one or more display devices 120a-120n (collectively, "display devices 120" or the like) and/or one or more audio playback devices 125a-125n (collectively, "audio playback devices 125" or the like), and/or the like. Each of the one or more playback devices 115 might communicatively couple to the computing system 105a, either via wireless connection and/or via wired connection. In some instances, system 100 might further comprise one or more user devices 130a-130n (collectively, "user devices 130" or the like) that might communicatively couple to the computing system 105a (either via wireless and/or wired connection), and might receive user input from a user and might relay the user input to the computing system 105a, according to some embodiments. In some cases, the user devices 130 might include, without limitation, at least one of a dedicated remote control device that is associated with the computing system 105a, a universal remote control device that has been paired, synced, or synchronized with the computing system 105a, a tablet computer that has been paired, synced, or synchronized with the computing system 105a, a smart phone that has been paired, synced, or synchronized with the computing system 105a, or other portable device that has been paired, synced, or synchronized with the computing system 105a, and/or the like. In some cases, the computing system 105a, the database 110a, the one or more playback devices 115 (including the display device(s) 120 and/or the audio playback device(s) 125, etc.), and the user device(s) 130 may be disposed within a customer premises 135, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

Figure 2A:
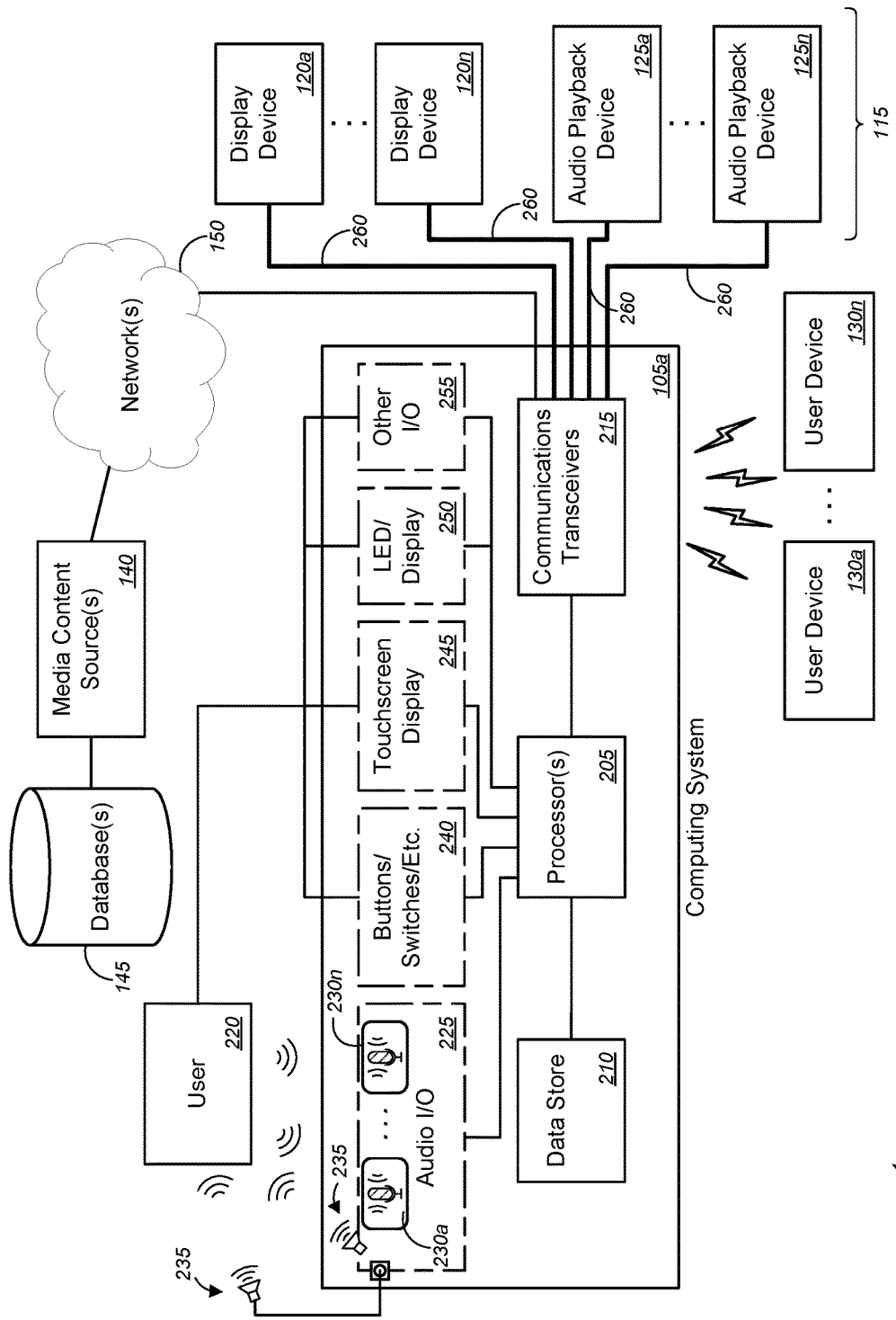
FIGS. 2A and 2B are schematic diagrams illustrating various embodiments of a system that may be used for implementing video quality optimization based on display capabilities.
Figure 2B:
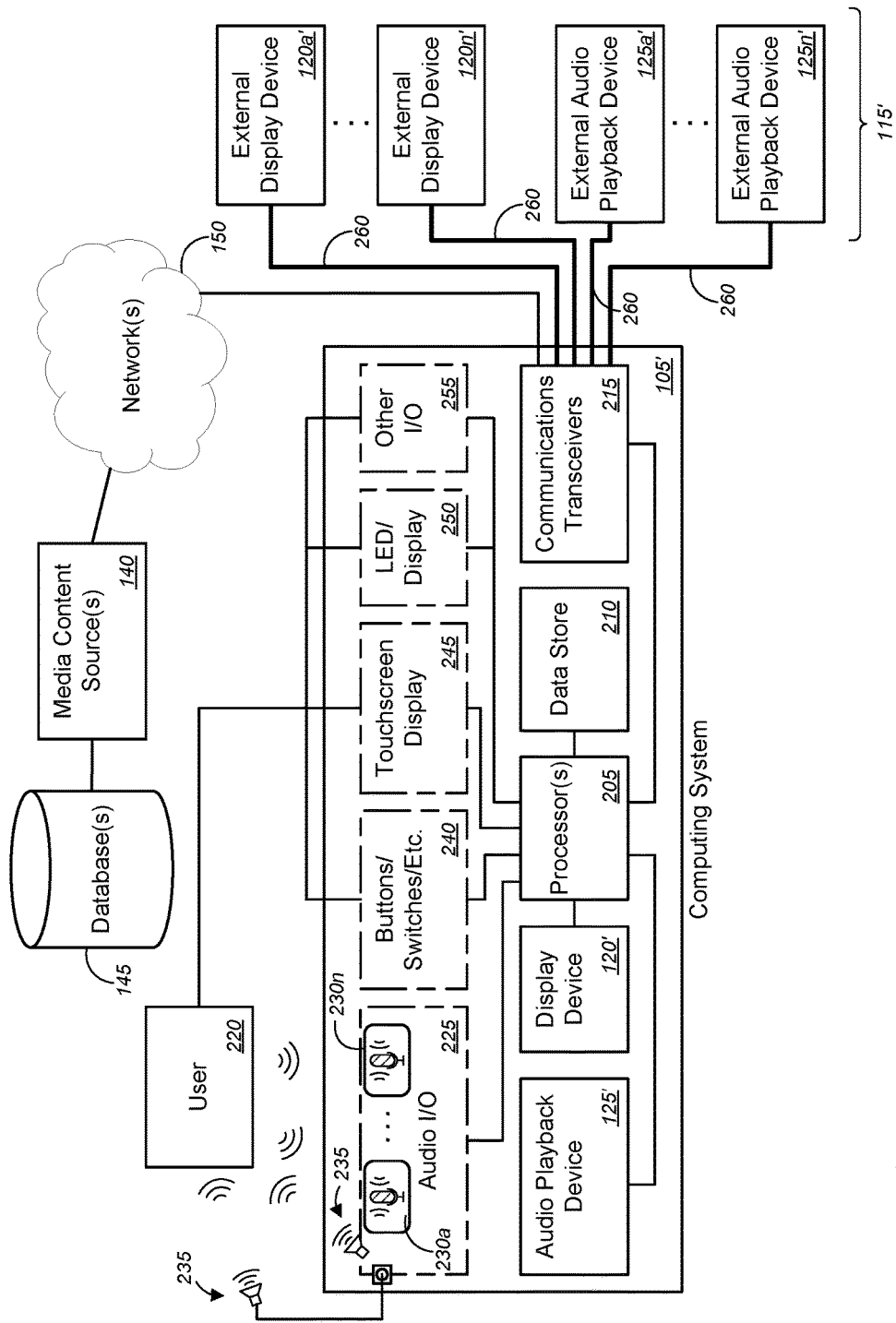

In some embodiments, the computing system 105a might comprise a media device that is communicatively coupled to the one or more playback devices 115. In some cases, the media device might include, but is not limited to, one of a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a streaming video player, a streaming music player, or a streaming game player, and/or the like, while the one or more playback devices 115 might include, but are not limited to, at least one of one or more monitors, one or more television sets, or one or more speakers, and/or the like. FIG. 2A depicts a non-limiting embodiment of such media devices. Alternatively, the computing system and the one or more playback devices 115 might be integrated within a single device, the single device including, without limitation, one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like. FIG. 2B depicts a non-limiting embodiment of such single devices.

System 100 might further comprise one or more media content sources or servers 140 and corresponding databases 145 that might communicatively couple to the computing system 105a via one or more networks 150 (and in some cases, via one or more telecommunications relay systems 155, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 155 and the computing system 105a, between the one or more telecommunications relay systems 155 and each of at least one of the user devices 130, between the computing system 105a and each of at least one of the playback devices 115, between the computing system 105a and each of at least one of the user devices 130, and/or the like. According to some embodiments, alternative or additional to the computing system 105a and corresponding database 110a being disposed within customer premises 135, system 100 might comprise remote computing system 105b and corresponding database(s) 110b that communicatively couple with the one or more user devices 130 in the customer premises via the one or more networks 150 (and in some cases, via the one or more telecommunications relay systems 155).

In operation, the computing system 105a or 105b might receive a first user input from a user (in some cases, either directly via interactions with the computing system 105a or 105b or indirectly via user device(s) 130a-130n and via network(s) 150, or the like) indicating a user request for a first media content. The computing system 105a or 105b might autonomously determine one or more first characteristics of a plurality of characteristics of a first playback device 115 (i.e., at least one of the one or more display devices 120a-120n or the one or more audio playback devices 125a-125n, or the like). The computing system 105a or 105b might subsequently send, to the media content source(s) 140 over network 150, a first request for the first media content, the first request comprising information regarding one or more first presentation characteristics that are based at least in part on the determined one or more first characteristics of the first playback device. The computing system 105a or 105b might receive a first version of the first media content, the first version of the first media content having the one or more first presentation characteristics, and might relay the received first version of the first media content to the first playback device 115 for presentation to the user of the first version of the first media content.

According to some embodiments, the one or more first characteristics might comprise at least one of video resolution, dynamic range, frame rate, or color gamut, and/or the like. In some cases, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like. Herein, the term "standard color gamut or SCG" might refer to color spaces used for standard definition television ("SDTV") or high definition TV ("HDTV") formats, including ITU-R Recommendation BT.601 (or Rec.601), ITU-R Recommendation BT.709 (or Rec.709), and/or the like. The term "wide color gamut or WCG" might refer to color spaces exceeding the color gamut BT.601 and BT.709, such as ITU-R Recommendation BT.2020 (or Rec. 2020), DCI-P3, and/or any other color space that may be standardized in the future.

In various embodiments, a STB, media player, or similar kind of replay device (i.e., computing system 105a or 105b of system 100 or the like) may be able to obtain information about the capabilities of the attached TV or other display and—if needed—cache it locally in non-volatile memory (either an external database 110a or 110b, or an integrated data store, such as data store 210 of FIG. 2A or 2B, or the like). Such information may include, but is not limited to, resolution, dynamic range capability, frame rate capability, and/or color space representation, or the like, as described above. The system may be able to automatically select content in a format whose quality best matches the capabilities of the attached display (in terms of resolution, dynamic range, color reproduction, and/or frame rate, or the like).

If the STB or media player is able to recognize whether the display has been disconnected or not since its most recent usage, it can also use local non-volatile memory to maintain status information about the display and its capabilities. If the STB or media player has determined that it is still connected to the same TV or display monitor, it can use the cached data to determine the level of content quality that it should request from the video service provider, thus reducing signaling overhead and any potential delay that may occur in querying the TV. If it is unable to recognize whether the connected TV is the same or a different model, it will query the TV to obtain all of the required information.

In a non-limiting example, if the user's display device is capable of 4K resolution, the STB or media player will request a 4K version of the selected content from the operator's or service provider's playout source or from the media content source(s). If the user's TV is only capable of HD resolution, then streaming 4K content does not make sense, as it would get down-sampled in the STB, media player, or the TV. This approach significantly reduces bandwidth usage in the operator's or service provider's network and guarantees that the user always receives a highest quality video feed, most closely matching the display's capabilities.

Various advantages arise from the various embodiments described herein. For instance, for operators or service providers, the various embodiments enable bandwidth optimization and bandwidth savings; prevent usage of network for information that will get discarded at the user's end (i.e., consumer device would not be able to display, e.g., an UHD and/or HDR/HFR/WCG video signal on a regular HDTV set). For vendors of STBs or media players, utilizing the various embodiments can allow such vendors to distinguish themselves amongst consumers by including this capability. For the users (i.e., subscribers/consumers, etc.), the various embodiments ensure that the users always get the best possible video signal that their TV can display. As mentioned above, although the various embodiments are described with respect to video quality optimization based on display capabilities, the various embodiments are not limited to video services, and can similarly apply to audio quality optimization based on audio capabilities, game play quality optimization based on display and audio capabilities, image quality optimization based on display capabilities, and/or the like.

These and other functions of the system 100 (and its components) are described in greater detail below with respect to FIGS. 2-4.

FIGS. 2A and 2B (collectively, "FIG. 2") are schematic diagrams illustrating various embodiments 200 and 200' of a system that may be used for implementing video quality optimization based on display capabilities.

In the non-limiting embodiment of FIG. 2A, according to some embodiments, system 200 might comprise a computing system 105a (which might correspond to computing system 105a of system 100 of FIG. 1, or the like) that might include, without limitation, one or more processors 205, one or more data stores or computer readable storage media 210, and one or more communications transceivers 215. In some instances, computing system 105a might enable indirect interaction with a user 220 via one or more user devices 130a-130n (which might correspond to user devices 130 of system 100 of FIG. 1, or the like). The lightning bolt symbols are used to denote wireless communications between the one or more communications transceivers 215 and each of at least one of the user devices 130, and/or the like.

Alternatively, or additionally, computing system 105a might comprise one or more user interface devices that enable direct interaction with the user 220. The one or more user interface devices, in some embodiments, might include, without limitation, at least one of one or more audio input/output ("I/O") devices 225 (which might include, but are not limited to, at least one of one or more microphones or audio sensors 230a-230n (collectively, "microphones 230" or "audio sensors 230"), one or more speakers 235, one or more sound amplitude detectors (not shown), one or more sound frequency detectors (not shown), or one or more voice recognition devices (not shown), and/or the like) (optional), one or more buttons/switches/dials/toggles/pointer stick/etc. 240 (collectively, "buttons 240") (optional), one or more touchscreen display devices 245 (which in some cases might include organic light emitting diode ("oLED") displays or similar displays, etc.) (optional), one or more LED/display devices 250 (optional), or one or more other I/O devices 255 (optional), and/or the like.

The one or more other I/O devices 255, in some cases, might include, without limitation, at least one of the following sets of components: a combination of one or more microphones, one or more speakers (which might include built-in speakers or external speakers connected through an audio jack or the like), one or more audio processors, and/or the like for voice interface functionality; one or more of at least one button, at least one touchscreen user interface, at least one display interface, and/or the like for touch interface functionality; one or more vibration, pressure, or force transducers and/or one or more pressure sensors that enable haptic feedback interface functionality; one or more wireless transceivers that communicate with one or more user devices associated with the user using any one or a combination of the wireless protocols described herein (including, but not limited to, 2.4 GHz or 5 GHz WiFi, Bluetooth, Z-wave, ZigBee, etc.) for wireless communication interface functionality; and/or the like. In some cases, the communications transceivers 215 might provide communications (either wired or wireless) between the computing system 105*a* and the media content source(s) or server(s) 140 and corresponding databases 145 (which might correspond to media content source(s) 140 and corresponding database(s) 145 of system 100 of FIG. 1, or the like) via network(s) 150 (which might correspond to network(s) 150 of system 100 of FIG. 1, or the like), might provide machine-to-machine communications (either wired or wireless) between the computing system 105*a* and each of the one or more playback devices 115 (which might correspond to the playback device(s) 115 of system 100 of FIG. 1, or the like), which might include, but are not limited to, one or more display devices 120*a*-120*n* (which might correspond to the display device(s) 120 of system 100 of FIG. 1, or the like) and/or one or more audio playback devices 125*a*-125*n* (which might correspond to the audio playback device(s) 125 of system 100 of FIG. 1, or the like), in some cases via one or more interface devices 260.

According to some embodiments, the one or more interface devices 260 might comprise at least one of one or more cables, one or more wireless links, and/or the like. The one or more cables, in some instances, might include, without limitation, at least one of one or more high-definition multimedia interface ("HDMI") cables, one or more display port cables, one or more digital visual interface ("DVI") cables, one or more universal serial bus ("USB") cables, one or more FireWire or IEEE 1394 cables, one or more video graphics array ("VGA") cables, one or more Thunderbolt cables, or one or more DisplayPort cables, and/or the like. Video interfaces such as HDMI (and potentially others) contain provisions that enable a media player (e.g., a STB, etc.) to request detailed information about capabilities from its attached display device. Furthermore, the HDMI standard is constantly being enhanced, and additional capabilities are very likely going to be added to future versions. As of filing of the '507 application, the most recent version of HDMI (i.e., HDMI 2.0a) includes support for so-called static HDR metadata (using the same set of HDR metadata for the entire content). The planned HDMI 2.1 includes support for dynamic, scene-by-scene HDR metadata. Another viable interface is DisplayPort. The current version (1.4, as of filing of the '507 application) includes HDR support. In the future, new video interfaces may emerge that expand on these capabilities, and the various embodiments would allow for implementation to allow for similar such capabilities. As described herein, additional information to be retrieved from the display may also include data such as manufacturer, model number, specific firmware revisions, factory calibration information, and/or similar types of data, or the like. Such data may be useful to further optimize picture quality.

The computing system 105*a*, the one or more playback devices 115, the one or more display devices 120*a*-120*n*, the one or more audio playback devices 125*a*-125*n*, the one or more user devices 130*a*-130*n*, the media content source(s) or server(s) 140, the databases 145, and the network(s) 150 of system 200 in FIG. 2A are otherwise similar, if not identical, to the computing system 105*a*, the one or more playback devices 115, the one or more display devices 120*a*-120*n*, the one or more audio playback devices 125*a*-125*n*, the one or more user devices 130*a*-130*n*, the media content source(s) or server(s) 140, the databases 145, and the network(s) 150, respectively, of system 100 in FIG. 1, and the descriptions of these components of system 100 are applicable to the corresponding components of system 200, respectively.

Turning to the non-limiting embodiment of FIG. 2B, in some embodiments, system 200' might comprise a computing system 105' (which might correspond to computing system 105*a* of system 100 of FIG. 1 or computing system 105*a* of system 200 of FIG. 2A, or the like) that might include, without limitation, one or more processors 205, one or more data stores or computer readable storage media 210, and one or more communications transceivers 215. The computing system 105' might further comprise at least one of display device 120' and/or audio playback device 125', each of which (if present) may be integrated within a housing of the computing system 105'.

In some instances, computing system 105' might comprise one or more user interface devices that enable direct interaction with the user 220. The one or more user interface devices, in some embodiments, might include, without limitation, at least one of one or more audio input/output ("I/O") devices 225 (which might include, but are not limited to, at least one of one or more microphones or audio sensors 230*a*-230*n* (collectively, "microphones 230" or "audio sensors 230"), one or more speakers 235, one or more sound amplitude detectors (not shown), one or more sound frequency detectors (not shown), or one or more voice recognition devices (not shown), and/or the like) (optional), one or more buttons/switches/dials/toggles/pointer stick/etc. 240 (collectively, "buttons 240") (optional), one or more touchscreen display devices 245 (which in some cases might include organic light emitting diode ("oLED") displays or similar displays, etc.) (optional), one or more LED/display devices 250 (optional), or one or more other I/O devices 255 (optional), and/or the like.

The one or more other I/O devices 255, in some cases, might include, without limitation, at least one of the following sets of components: a combination of one or more microphones, one or more speakers (which might include built-in speakers or external speakers connected through an audio jack or the like), one or more audio processors, and/or the like for voice interface functionality; one or more of at least one button, at least one touchscreen user interface, at least one display interface, and/or the like for touch interface functionality; one or more vibration, pressure, or force transducers and/or one or more pressure sensors that enable haptic feedback interface functionality; one or more wireless transceivers that communicate with one or more user devices associated with the user using any one or a combination of the wireless protocols described herein (including, but not limited to, 2.4 GHz or 5 GHz WiFi, Bluetooth, Z-wave, ZigBee, etc.) for wireless communication interface functionality; and/or the like. In some cases, the communications transceivers 215 might provide communications (either wired or wireless) between the computing system 105' and the media content source(s) or server(s) 140 and corresponding databases 145 (which might correspond to media content source(s) 140 and corresponding database(s) 145 of system 100 of FIG. 1, or the like) via network(s) 150 (which might correspond to network(s) 150 of system 100 of FIG. 1, or the like), might provide machine-to-machine communications (either wired or wireless) between the computing system 105' and each of the one or more external playback devices 115' (which might correspond to the playback device(s) 115 of system 100 of FIG. 1 or the playback device(s) 115 of system 200 of FIG. 2A, or the like), which might include, but are not limited to, one or more external display devices 120*a*-120*n* (which might correspond to the display device(s) 120 of system 100 of FIG. 1 or the display devices 120*a*-120*n* of system 200 of FIG. 2A, or the like) and/or one or more external audio playback devices 125*a*-125*n* (which might correspond to the audio playback device(s) 125 of system 100 of FIG. 1 or the audio playback devices 125a-125n of system 200 of FIG. 2A, or the like), in some cases via one or more interface devices 260.

According to some embodiments, the one or more interface devices 260 might comprise at least one of one or more cables, one or more wireless links, and/or the like. The one or more cables, in some instances, might include, without limitation, at least one of one or more high-definition multimedia interface ("HDMI") cables, one or more display port cables, one or more digital visual interface ("DVI") cables, one or more universal serial bus ("USB") cables, one or more FireWire or IEEE 1394 cables, one or more video graphics array ("VGA") cables, one or more Thunderbolt cables, or one or more DisplayPort cables, and/or the like. Video interfaces such as HDMI (and potentially others) contain provisions that enable a media player (e.g., a STB, etc.) to request detailed information about capabilities from its attached display device. Furthermore, the HDMI standard is constantly being enhanced, and additional capabilities are very likely going to be added to future versions. As of filing of the '507 application, the most recent version of HDMI (i.e., HDMI 2.0a) includes support for so-called static HDR metadata (using the same set of HDR metadata for the entire content). The planned HDMI 2.1 includes support for dynamic, scene-by-scene HDR metadata. Another viable interface is DisplayPort. The current version (1.4, as of filing of the '507 application) includes HDR support. In the future, new video interfaces may emerge that expand on these capabilities, and the various embodiments would allow for implementation to allow for similar such capabilities. As described herein, additional information to be retrieved from the display may also include data such as manufacturer, model number, specific firmware revisions, factory calibration information, and/or similar types of data, or the like. Such data may be useful to further optimize picture quality.

The computing system 105', the one or more user interface devices 225-255, the one or more external playback devices 115, the one or more external display devices 120a'-120n', the one or more external audio playback devices 125a'-125n', the media content source(s) or server(s) 140, the databases 145, and the network(s) 150 of system 200' in FIG. 2B are otherwise similar, if not identical, to the computing system 105a, the one or more user interface devices 225-255, the one or more playback devices 115, the one or more display devices 120a-120n, the one or more audio playback devices 125a-125n, the one or more user devices 130a-130n, the media content source(s) or server(s) 140, the databases 145, and the network(s) 150 of system 200 in FIG. 2A, and the descriptions of these components of system 200 are applicable to the corresponding components of system 200', respectively.

The computing system 105', the one or more external playback devices 115, the one or more external display devices 120a'-120n' (as well as the integrated display devices 120'), the one or more external audio playback devices 125a'-125n' (as well as the integrated audio playback devices 125'), the media content source(s) or server(s) 140, the databases 145, and the network(s) 150 of system 200' in FIG. 2B are otherwise similar, if not identical, to the computing system 105a, the one or more playback devices 115, the one or more display devices 120a-120n', the one or more audio playback devices 125a-125n, the media content source(s) or server(s) 140, the databases 145, and the network(s) 150, respectively, of system 100 in FIG. 1, and the descriptions of these components of system 100 are applicable to the corresponding components of system 200', respectively.

FIGS. 3A-3D (collectively, "FIG. 3") are flow diagrams illustrating a method 300 for implementing video quality optimization based on display capabilities, in accordance with various embodiments. Method 300 of FIG. 3A continues onto FIG. 3B following the circular marker denoted, "A," which continues onto FIG. 3C following the circular marker denoted, "B," or continues onto FIG. 3D following the circular marker denoted, "C."

While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the systems 100, 200, and 200' of FIGS. 1, 2A, and 2B, respectively (or components thereof), such methods may also be implemented using any suitable hardware (or software) implementation. Similarly, while each of the systems 100, 200, and 200' of FIGS. 1, 2A, and 2B, respectively (or components thereof), can operate according to the method 300 illustrated by FIG. 3 (e.g., by executing instructions embodied on a computer readable medium), the systems 100, 200, and 200' of FIGS. 1, 2A, and 2B can each also operate according to other modes of operation and/or perform other suitable procedures.

Figure 3A:
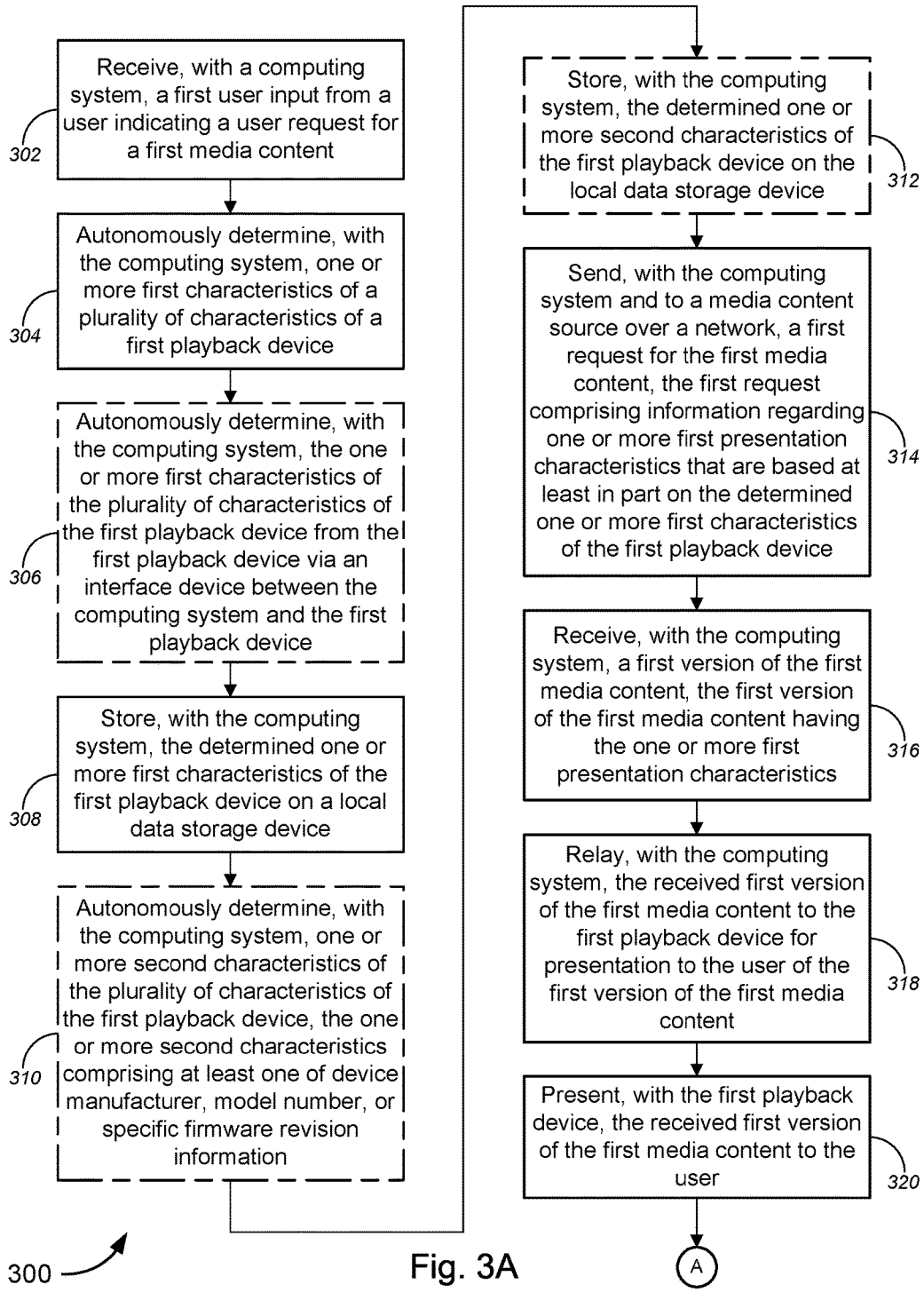
FIGS. 3A-3D are flow diagrams illustrating a method for implementing video quality optimization based on display capabilities, in accordance with various embodiments.

In the non-limiting embodiment of FIG. 3A, method 300, at block 302, receiving, with a computing system (which might correspond to computing systems 105a, 105b, and 105' of FIGS. 1, 2A, and 2B, or the like), a first user input from a user indicating a user request for a first media content. At block 304, method 300 might comprise autonomously determining, with the computing system, one or more first characteristics of a plurality of characteristics of a first playback device (which might correspond to display devices 120a-120n', 120a'-120n'', 120', 245, and 250 of FIGS. 1, 2A, and 2B, or the like, to audio playback devices 125a-125n, 125a'-125n', 125', 225, and 235 of FIGS. 1, 2A, and 2B, or the like, or to playback devices 115 and 115' of FIGS. 1, 2A, and 2B, or the like). In some cases, autonomously determining the one or more first characteristics of the first playback device might comprise autonomously determining, with the computing system, the one or more first characteristics of the plurality of characteristics of the first playback device from the first playback device via an interface device (which might correspond to interface devices 260 of FIG. 2, or the like) between the computing system and the first playback device (optional block 306).

In some embodiments, the computing system might comprise a media device that is communicatively coupled to the first playback device. In some cases, the media device might include, but is not limited to, one of a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a streaming video player, a streaming music player, or a streaming game player, and/or the like, while the playback device might include, but is not limited to, at least one of one or more monitors, one or more television sets, or one or more speakers, and/or the like. Alternatively, the computing system and the first playback device(s) might be integrated within a single device, the single device including, without limitation, one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

According to some embodiments, the one or more first characteristics might comprise at least one of video resolution, dynamic range, frame rate, or color gamut, and/or the like. In some cases, the video resolution might comprise one of 8K ultra-high-definition ("UHD"), 4K UHD, 1080 p full high-definition ("HD"), 1080 i full HDi, '720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

Method 300 might further comprise, at block 308, storing, with the computing system, the determined one or more first characteristics of the first playback device on a local data storage device (which might correspond to database(s) 110a or 110b, or data store 210 of FIGS. 1 and 2, or the like). Method 300 might further comprise autonomously determining, with the computing system, one or more second characteristics of the plurality of characteristics of the first playback device, the one or more second characteristics including, without limitation, at least one of device manufacturer, model number, or specific firmware revision information, and/or the like (optional block 310) and storing, with the computing system, the determined one or more second characteristics of the first playback device on the local data storage device (optional block 312).

At block 314, method 300 might comprise sending, with the computing system and to a media content source (which might correspond to media content sources (or servers) 140 and corresponding databases 145 of FIGS. 1, 2A, and 2B, or the like) over a network (which might correspond to network 150 of FIGS. 1 and 2, or the like), a first request for the first media content, the first request comprising information regarding one or more first presentation characteristics that are based at least in part on the determined one or more first characteristics of the first playback device (and, in some cases, also based at least in part on the determined one or more second characteristics of the first playback device).

Method 300, at block 316, might comprise receiving, with the computing system, a first version of the first media content, the first version of the first media content having the one or more first presentation characteristics. Method 300 might further comprise relaying, with the computing system, the received first version of the first media content to the first playback device for presentation to the user of the first version of the first media content (block 318) and presenting, with the first playback device, the received first version of the first media content to the user (block 320). Method 300 might continue onto the process at block 322 in FIG. 3B following the circular marker denoted, "A."

Figure 3B:
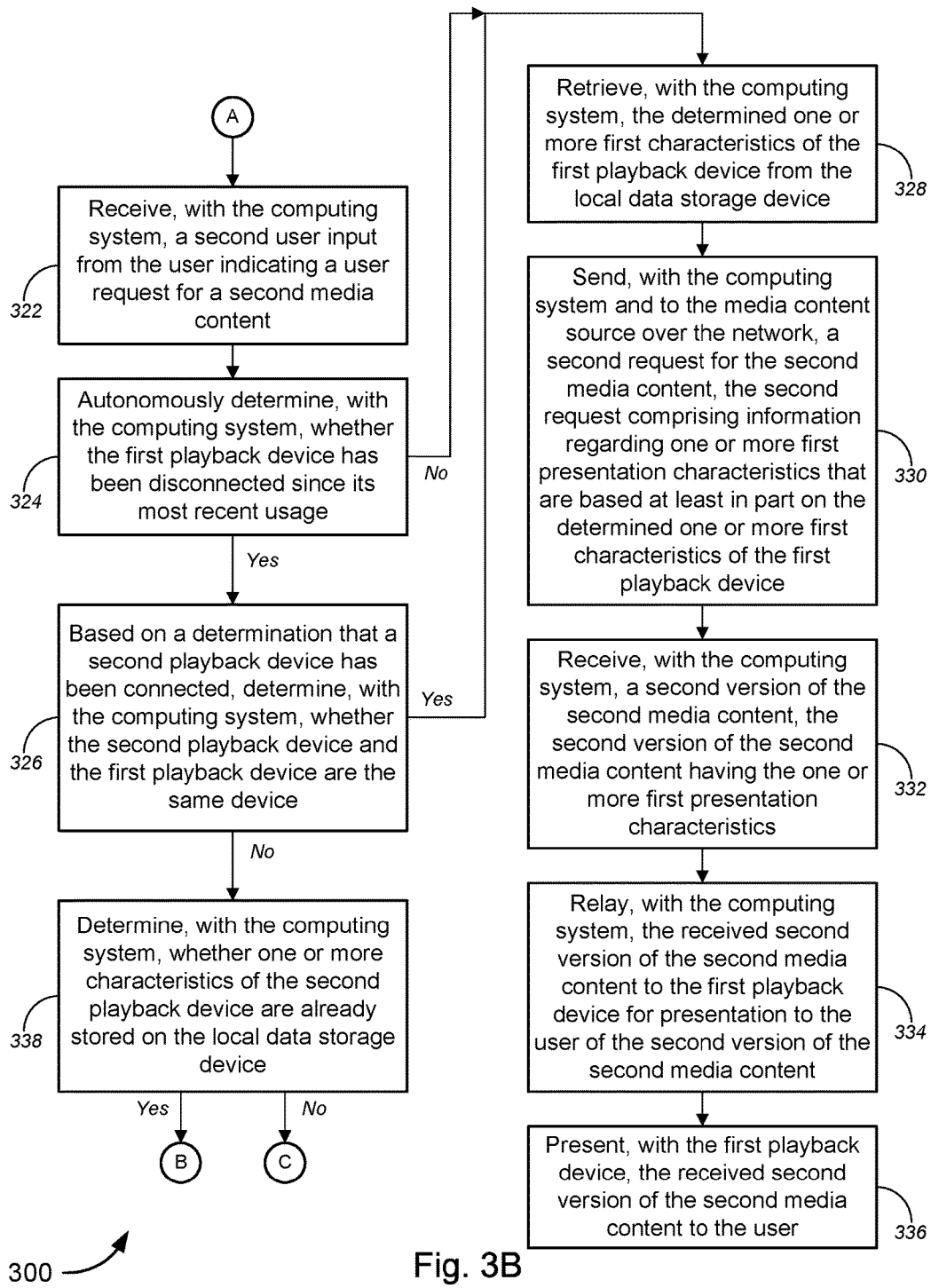

Turning to FIG. 3B, method 300, at block 322, might comprise receiving, with the computing system, a second user input from the user indicating a user request for a second media content. Method 300 might further comprise autonomously determining, with the computing system, whether the first playback device has been disconnected since its most recent usage (block 324). If not, method 300 skips to the process at block 328. If so, method 300 continues onto the process at block 326, at which method 300 might comprise based on a determination that a second playback device has been connected, determining, with the computing system, whether the second playback device and the first playback device are the same device. If not, method 300 skips to the process at block 338. If so, method 300 continues onto the process at block 328, at which, method 300 might comprise retrieving, with the computing system, the determined one or more first characteristics of the first playback device from the local data storage device. At block 330, method 300 might comprise sending, with the computing system and to the media content source over the network, a second request for the second media content, the second request comprising information regarding one or more first presentation characteristics that are based at least in part on the determined one or more first characteristics of the first playback device. Method 300 might further comprise receiving, with the computing system, a second version of the second media content, the second version of the second media content having the one or more first presentation characteristics (block 332), relaying, with the computing system, the received second version of the second media content to the first playback device for presentation to the user of the second version of the second media content (block 334), and presenting, with the first playback device, the received second version of the second media content to the user (block 336). Turning back to block 326, based on a determination that the second playback device and the first playback device are different devices, method 300 proceeds to the process at block 338, at which method 300 might comprise determining, with the computing system, whether one or more characteristics of the second playback device are already stored on the local data storage device. If so, method 300 continues onto the process at block 340 in FIG. 3C following the circular marker denoted, "B." If not, method 300 continues onto the process at block 350 in FIG. 3D following the circular marker denoted, "C."

Figure 3C:
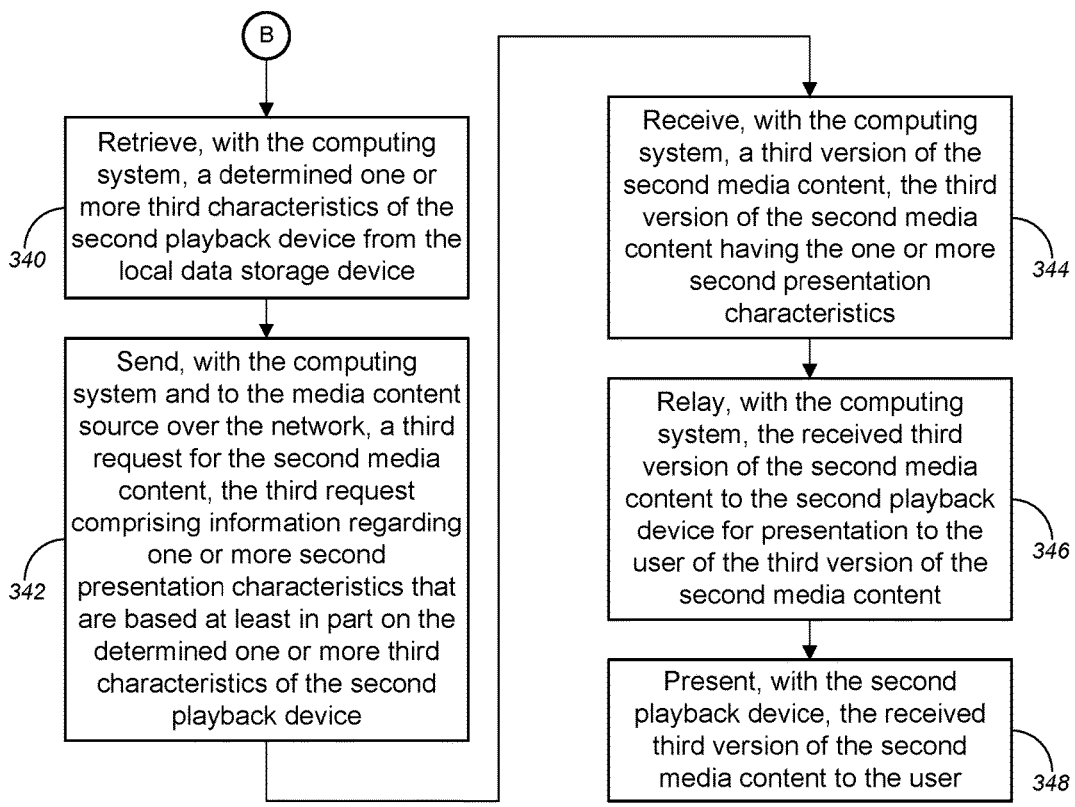

With reference to FIG. 3C (following the circular marker denoted, "B"), method 300, at block 340, might comprise retrieving, with the computing system, a determined one or more third characteristics of the second playback device from the local data storage device. At block 342, method 300 might comprise sending, with the computing system and to the media content source over the network, a third request for the second media content, the third request comprising information regarding one or more second presentation characteristics that are based at least in part on the determined one or more third characteristics of the second playback device. Method 300 might further comprise receiving, with the computing system, a third version of the second media content, the third version of the second media content having the one or more second presentation characteristics (block 344), relaying, with the computing system, the received third version of the second media content to the second playback device for presentation to the user of the third version of the second media content (block 346), and presenting, with the second playback device, the received third version of the second media content to the user (block 348).

Figure 3D:
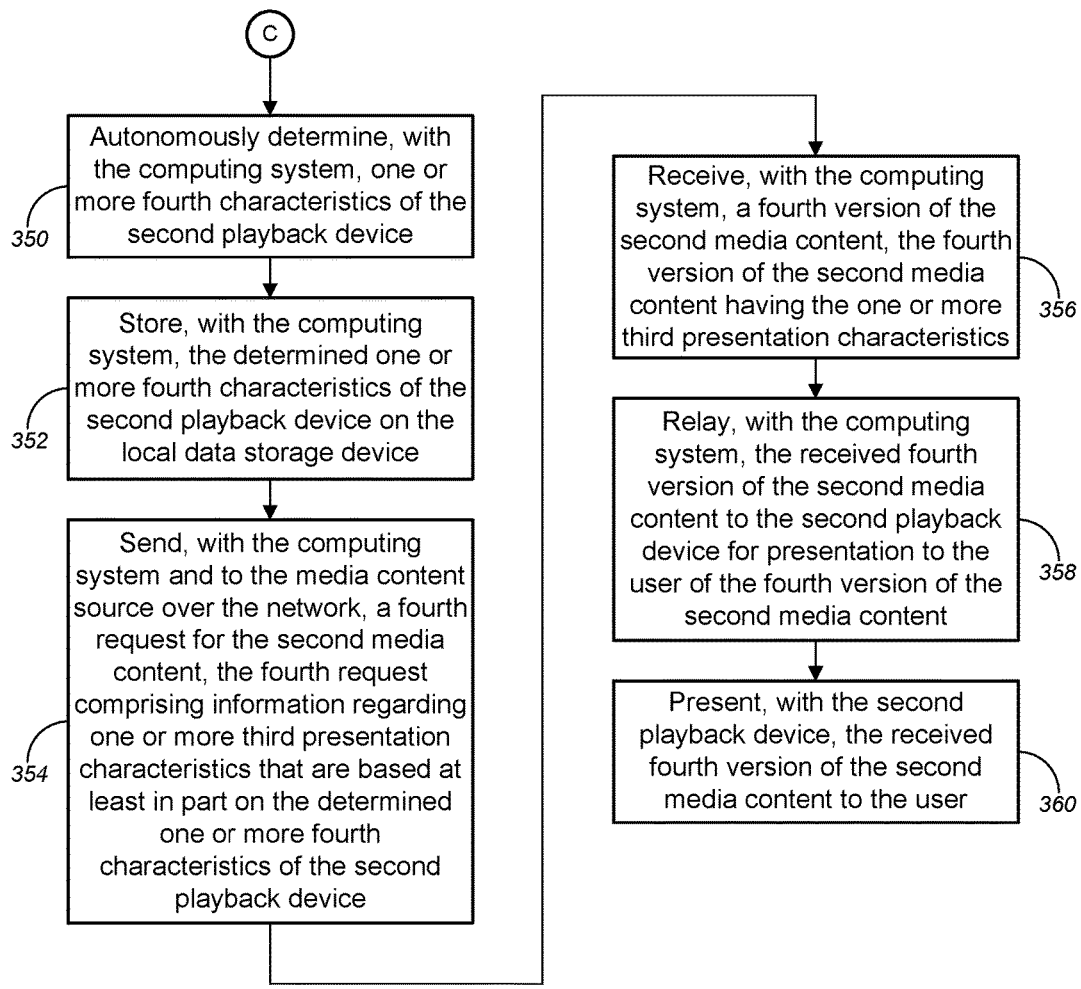

Turning to FIG. 3D (following the circular marker denoted, "C"), method 300, at block 350, might comprise autonomously determining, with the computing system, one or more fourth characteristics of the second playback device. Method 300 might further comprise, at block 352, storing, with the computing system, the determined one or more fourth characteristics of the second playback device on the local data storage device. At block 354, method 300 might comprise sending, with the computing system and to the media content source over the network, a fourth request for the second media content, the fourth request comprising information regarding one or more third presentation characteristics that are based at least in part on the determined one or more fourth characteristics of the second playback device. Method 300 might further comprise receiving, with the computing system, a fourth version of the second media content, the fourth version of the second media content having the one or more third presentation characteristics (block 356), relaying, with the computing system, the received fourth version of the second media content to the second playback device for presentation to the user of the fourth version of the second media content (block 358), and presenting, with the second playback device, the received fourth version of the second media content to the user (block 360).

Figure 4A:
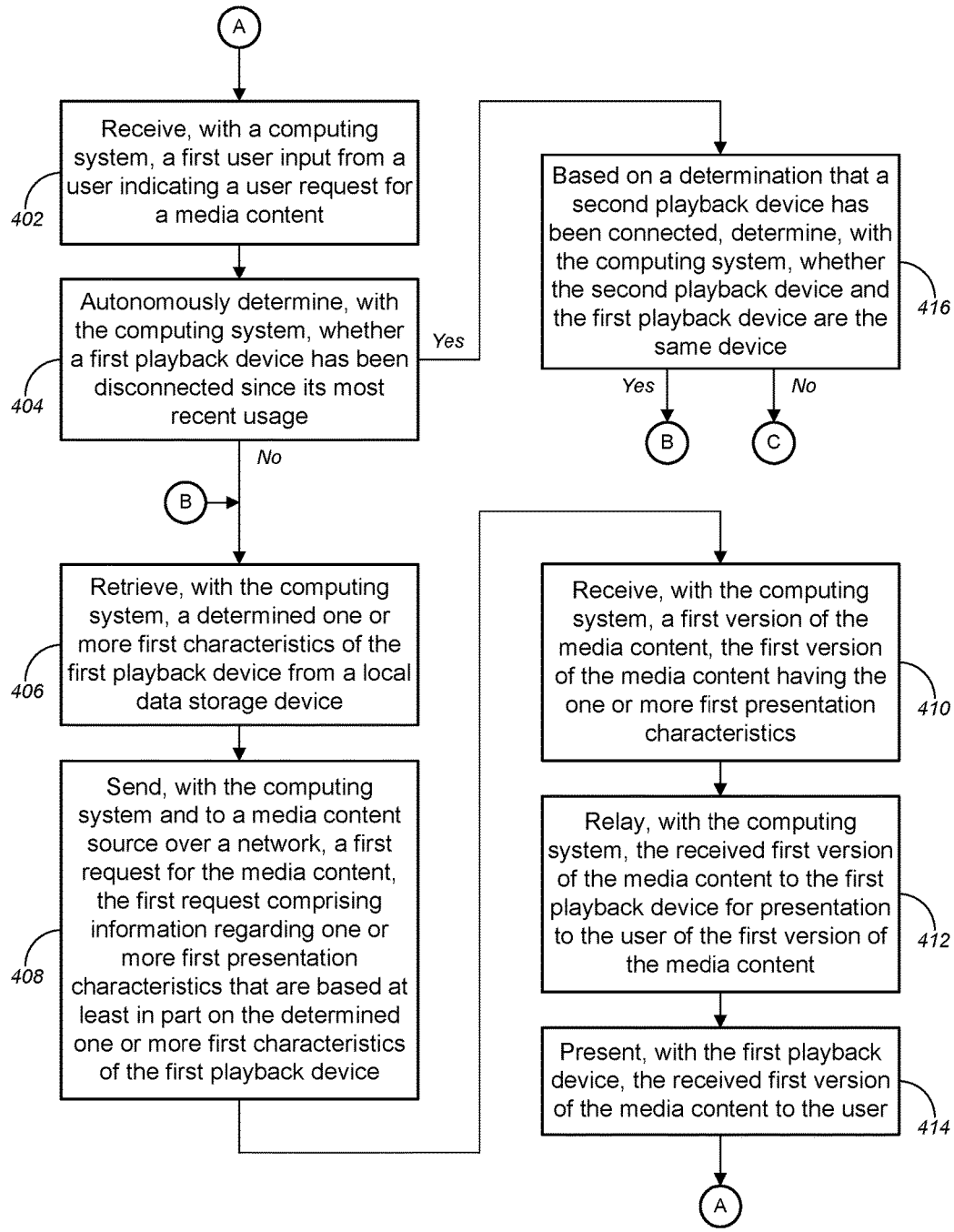
FIGS. 4A-4C are flow diagrams illustrating another method for implementing video quality optimization based on display capabilities, in accordance with various embodiments.
Figure 4B:
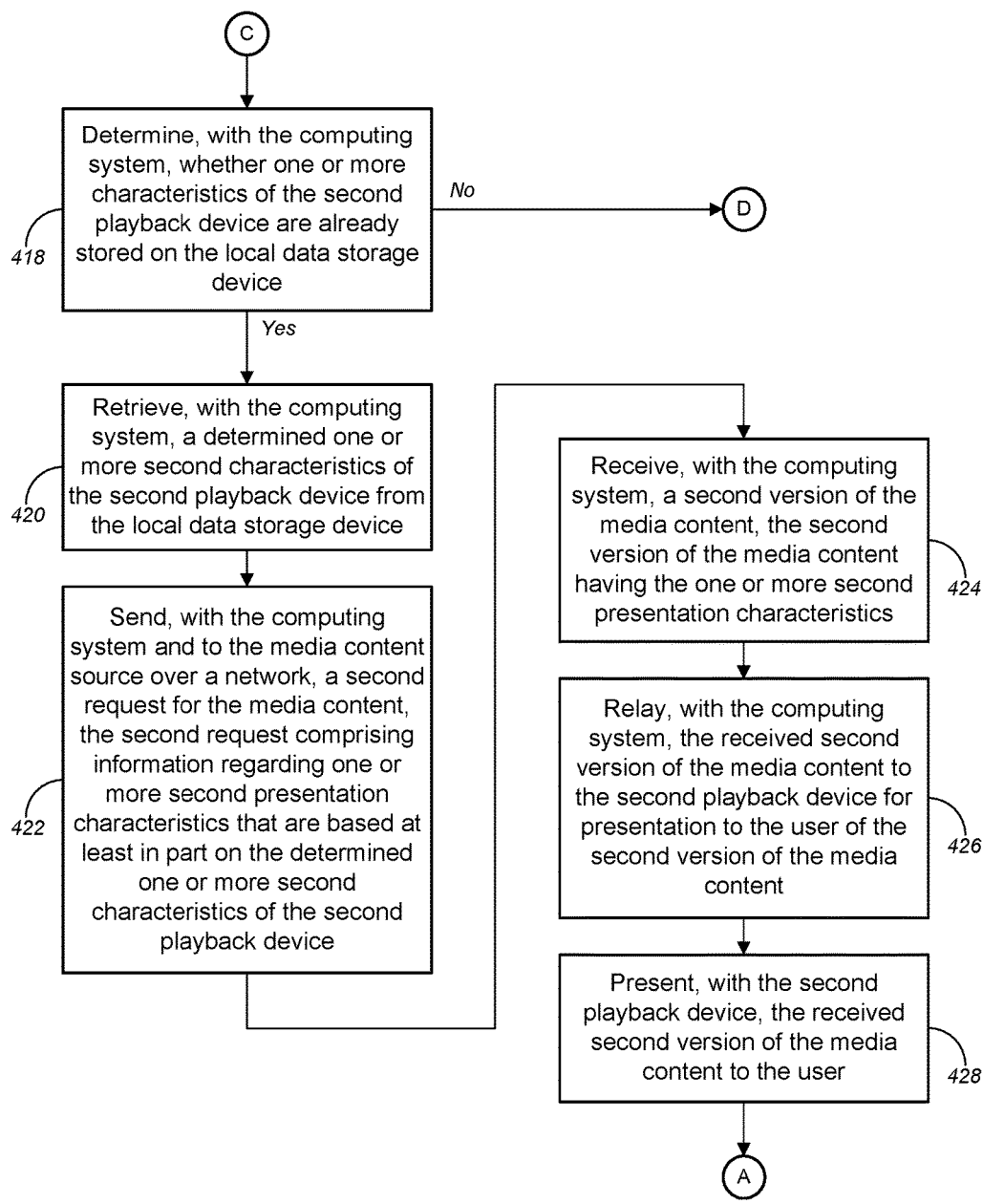
Figure 4C:
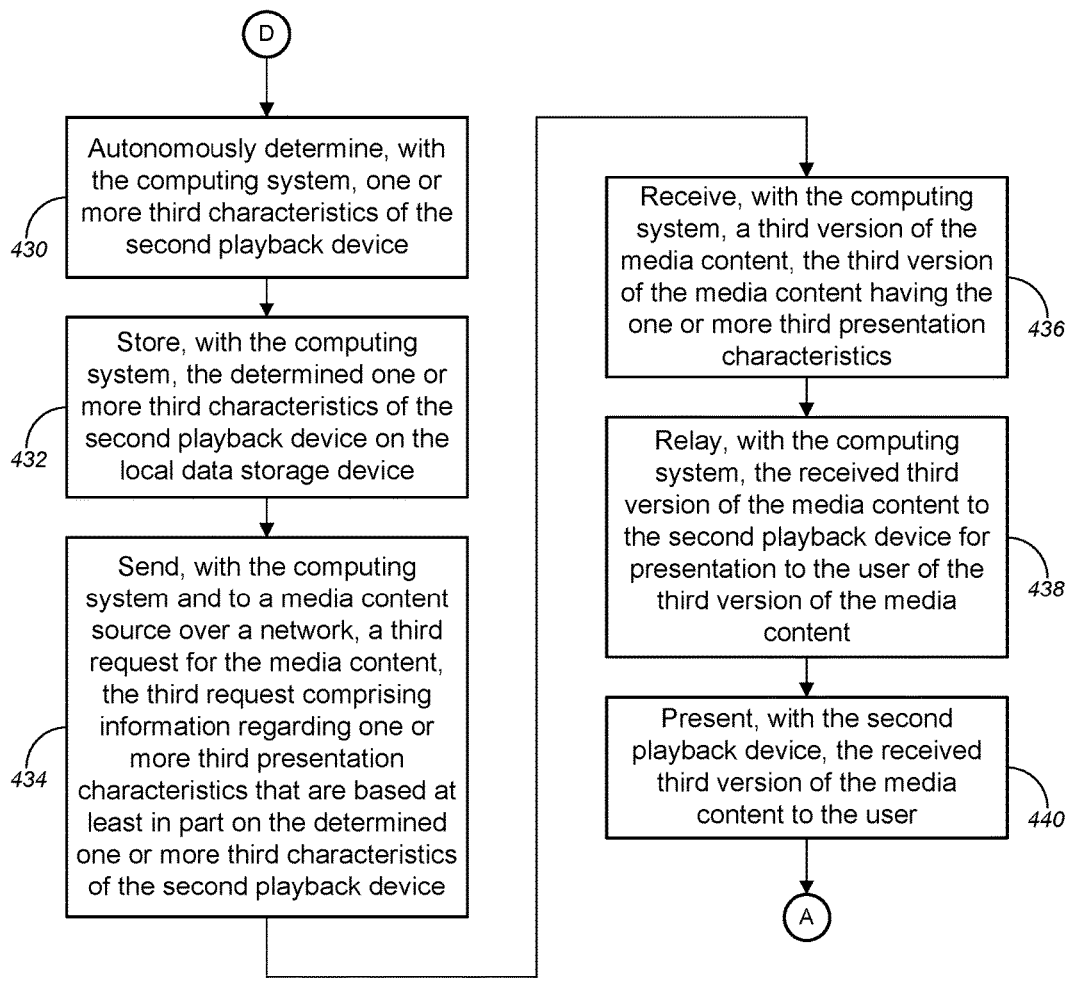

FIGS. 4A-4C (collectively, "FIG. 4") are flow diagrams illustrating another method 400 for implementing video quality optimization based on display capabilities, in accordance with various embodiments. Method 400 of FIG. 4A continues onto FIG. 4B following the circular marker denoted, "C," which continues onto FIG. 4C following the circular marker denoted, "D." Method 400 of each of FIGS. 4B and 4C return to FIG. 4A following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 200' of FIGS. 1, 2A, and 2B, respectively (or components thereof), such methods may also be implemented using any suitable hardware (or software) implementation. Similarly, while each of the systems 100, 200, and 200' of FIGS. 1, 2A, and 2B, respectively (or components thereof), can operate according to the method 400 illustrated by FIG. 4 (e.g., by executing instructions embodied on a computer readable medium), the systems 100, 200, and 200' of FIGS. 1, 2A, and 2B can each also operate according to other modes of operation and/or perform other suitable procedures.

In the non-limiting embodiment of FIG. 4A, method 400, at block 402, receiving, with a computing system (which might correspond to computing systems 105a, 105b, and 105' of FIGS. 1, 2A, and 2B, or the like), a first user input from a user indicating a user request for a media content. Method 400 might further comprise autonomously determining, with the computing system, whether a first playback device (which might correspond to display devices 120a-120n', 120a'-120n", 120', 245, and 250 of FIGS. 1, 2A, and 2B, or the like, to audio playback devices 125a-125n, 125a'-125n', 125', 225, and 235 of FIGS. 1, 2A, and 2B, or the like, or to playback devices 115 and 115' of FIGS. 1, 2A, and 2B, or the like) has been disconnected since its most recent usage (block 404). If so, method 400 skips to the process at block 416. If not, method 400 continues on the process at block 406.

In some embodiments, the computing system might comprise a media device that is communicatively coupled to the first playback device. In some cases, the media device might include, but is not limited to, one of a set-top box ("STB"), a media player, a gaming console, a server computer, a desktop computer, or a laptop computer, and/or the like. The media player might include, without limitation, one of a digital versatile disc or digital video disc ("DVD") player, a Blu-ray disc ("BD") player, a streaming video player, a streaming music player, or a streaming game player, and/or the like, while the playback device might include, but is not limited to, at least one of one or more monitors, one or more television sets, or one or more speakers, and/or the like. Alternatively, the computing system and the first playback device(s) might be integrated within a single device, the single device including, without limitation, one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

According to some embodiments, the one or more first characteristics might comprise at least one of video resolution, dynamic range, frame rate, or color gamut, and/or the like. In some cases, the video resolution might comprise one of 8K ultra-high-definition ("UHD"), 4K UHD, 1080 p full high-definition ("HD"), 1080 i full HDi, 720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

Method 400, at block 406, might comprise retrieving, with the computing system, a determined one or more first characteristics of the first playback device from a local data storage device (which might correspond to database(s) 110a or 110b, or data store 210 of FIGS. 1 and 2, or the like). At block 408, method 400 might comprise sending, with the computing system and to a media content source (which might correspond to media content sources (or servers) 140 and corresponding databases 145 of FIGS. 1, 2A, and 2B, or the like) over a network (which might correspond to network 150 of FIGS. 1 and 2, or the like), a first request for the media content, the first request comprising information regarding one or more first presentation characteristics that are based at least in part on the determined one or more first characteristics of the first playback device. Method 400, at block 410, might comprise receiving, with the computing system, a first version of the media content, the first version of the media content having the one or more first presentation characteristics. Method 400 might further comprise relaying, with the computing system, the received first version of the media content to the first playback device for presentation to the user of the first version of the media content (block 412) and presenting, with the first playback device, the received first version of the media content to the user (block 414). Method 400 might return to the process at block 402 following the circular marker denoted, "A."

With reference to the process at block 416, method 400 might comprise, based on a determination that the first playback device has been disconnected since its most recent usage (at block 404) and based on a determination that a second playback device has been connected, determining, with the computing system, whether the second playback device and the first playback device are the same device. If so, method 400 continues onto the process at block 406, following the circular marker denoted, "B." If not, method 400 continues onto the process at block 418 in FIG. 4B, following the circular marker denoted, "C."

Turning to FIG. 4B (following the circular marker denoted, "C"), method 400, at block 418, might comprise determining, with the computing system, whether one or more characteristics of the second playback device are already stored on the local data storage device. If not, method 400 continues onto the process at block 430 in FIG.

4C following the circular marker denoted, "D." If so, method 400 continues onto the process at block 420. At block 420, method 400 might comprise retrieving, with the computing system, a determined one or more second characteristics of the second playback device from the local data storage device. At block 422, method 400 might comprise sending, with the computing system and to the media content source over the network, a second request for the media content, the second request comprising information regarding one or more second presentation characteristics that are based at least in part on the determined one or more second characteristics of the second playback device. Method 400 might further comprise receiving, with the computing system, a second version of the media content, the second version of the media content having the one or more second presentation characteristics (block 424), relaying, with the computing system, the received second version of the media content to the second playback device for presentation to the user of the second version of the media content (block 426), and presenting, with the second playback device, the received second version of the media content to the user (block 428). Method 400 might return to the process at block 402 in FIG. 4A, following the circular marker denoted, "A."

With reference to FIG. 4C (following the circular marker denoted, "D"), method 400, at block 430, autonomously determining, with the computing system, one or more third characteristics of the second playback device. Method 400 might further comprise, at block 432, storing, with the computing system, the determined one or more third characteristics of the second playback device on the local data storage device. At block 434, method 400 might comprise sending, with the computing system and to the media content source over the network, a third request for the media content, the third request comprising information regarding one or more third presentation characteristics that are based at least in part on the determined one or more third characteristics of the second playback device. Method 400 might further comprise receiving, with the computing system, a third version of the media content, the third version of the media content having the one or more third presentation characteristics (block 436), relaying, with the computing system, the received third version of the media content to the second playback device for presentation to the user of the third version of the media content (block 438), and presenting, with the second playback device, the received third version of the media content to the user (block 440). Method 400 might return to the process at block 402 in FIG. 4A, following the circular marker denoted, "A."

Exemplary System and Hardware Implementation

Figure 5:
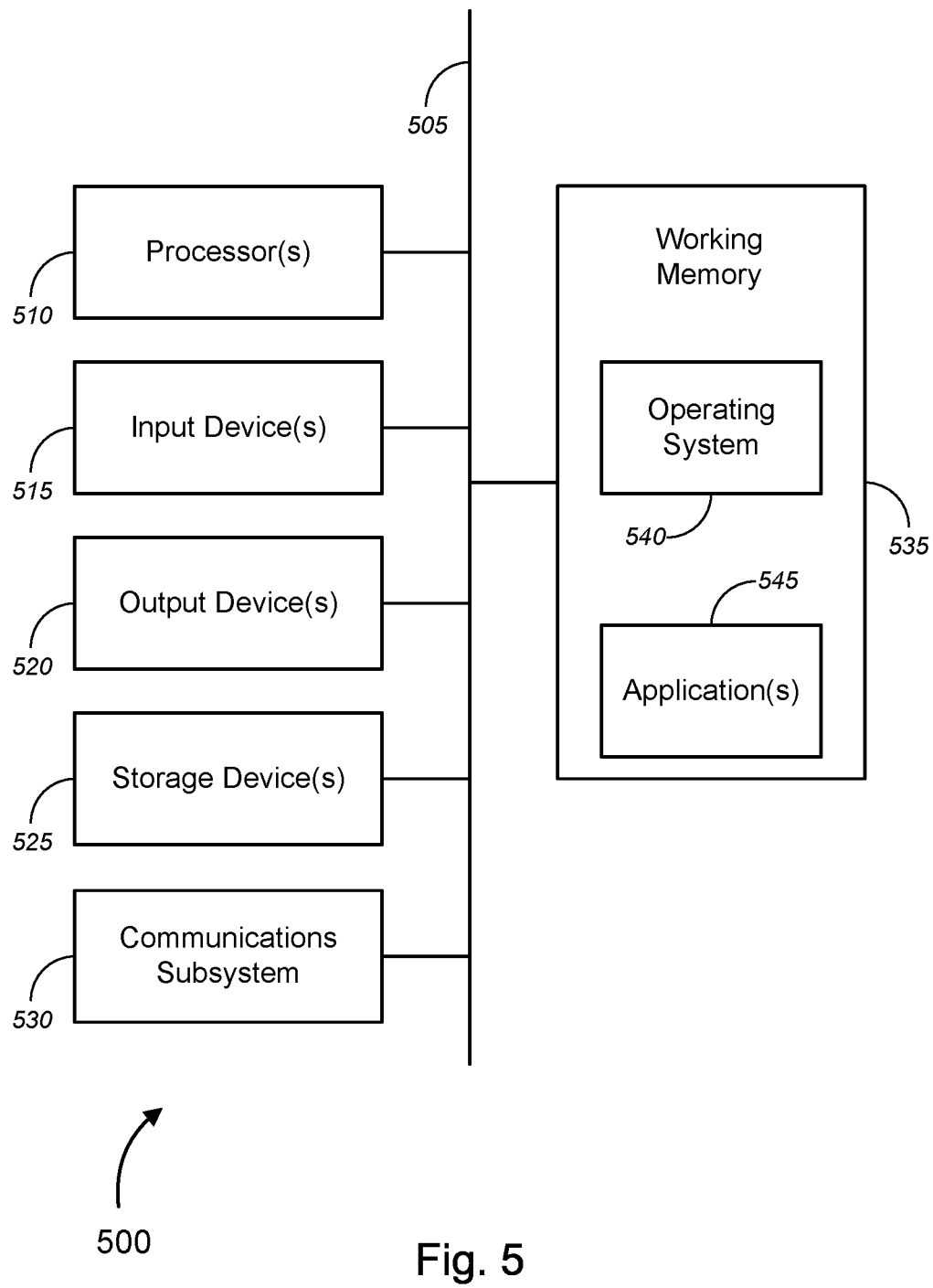
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a, 105b, and 105', display devices 120a-120n', 120a'-120n'', 120', 245, and 250, audio playback devices 125a-125n, 125a-125n', 125', 225, and 235, playback devices 115 and 115', user devices 130a-130n, media content sources (or servers) 140, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a, 105b, and 105', display devices 120a-120n', 120a'-120n'', 120', 245, and 250, audio playback devices 125a-125n, 125a-125n', 125', 225, and 235, playback devices 115 and 115', user devices 130a-130n, media content sources (or servers) 140, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
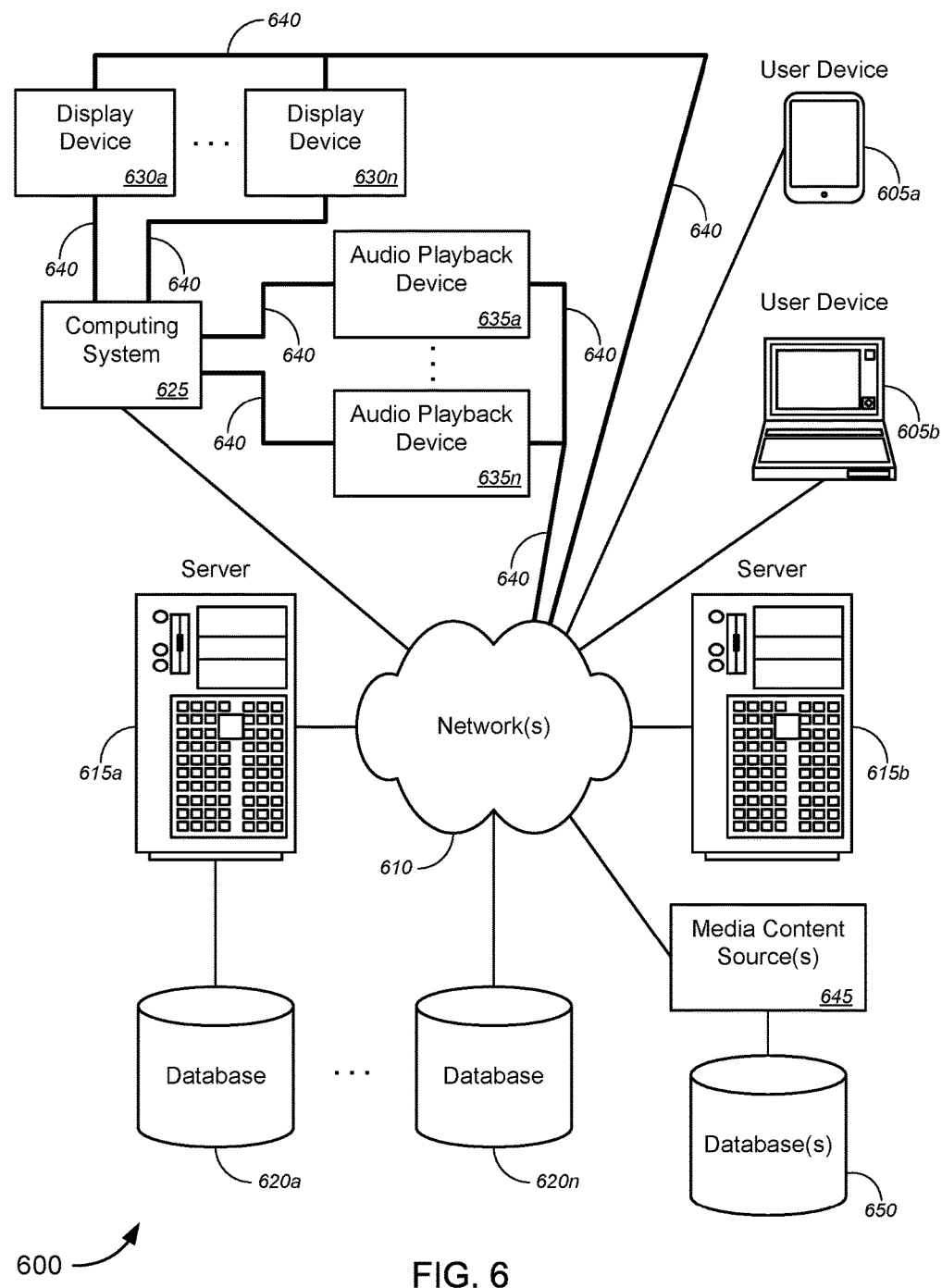
FIG. 6 is a block diagram illustrating a networked system of computers, computing systems, or system hardware architecture, which can be used in accordance with various embodiments.

As noted above, a set of embodiments comprises methods and systems for implementing media content streaming or downloading and media content playback, and, more particularly, to methods, systems, and apparatuses for implementing video quality optimization based on display capabilities. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 150 FIG. 1, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing media content streaming or downloading and media content playback, and, more particularly, to methods, systems, and apparatuses for implementing video quality optimization based on display capabilities, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105a, 105b, and 105' of FIGS. 1, 2A, and 2B, or the like), one or more display devices 630a-630n (similar to display devices 120a-120n', 120a-120n", 120', 245, and 250 of FIGS. 1, 2A, and 2B, or the like), one or more audio playback devices 635a-635n (similar to audio playback devices 125a-125n, 125a'-125n', 125', 225, and 235 of FIGS. 1, 2A, and 2B, or the like), interface devices 640 (similar to interface devices 260 of FIG. 2, or the like), one or more media content sources 645 and corresponding database(s) 650 (similar to media content sources (or servers) 140 and corresponding databases 145 of FIGS. 1, 2A, and 2B, or the like), and/or the like. In some embodiments, the computing system might comprise a media device that is communicatively coupled to a playback device(s) (i.e., one or more of display device(s) 630a-630n and/or audio playback device(s) 635a-635n, or the like). In some cases, the media device might comprise one of a set-top box ("STB"), a media player, a gaming console, a server computer, a desktop computer, or a laptop computer, and/or the like. The media player might comprise one of a digital versatile disc or digital video disc ("DVD") player, a Blu-ray disc ("BD") player, a streaming video player, a streaming music player, or a streaming game player, and/or the like, while the playback device might comprise at least one of one or more monitors, one or more television sets, or one or more speakers, and/or the like. Alternatively, the computing system and the playback device(s) might be integrated within a single device, the single device comprising one of a tablet computer, a laptop computer, a smart phone, a mobile phone, a personal digital assistant, a portable gaming device, a smart watch, a virtual reality ("VR") device, an augmented reality ("AR") device, or a portable music player, and/or the like.

In operation, the computing system 625 (or server 615a or 615b) might receive a first user input from a user (in some cases, either directly via interactions with the computing system 625 or indirectly via user device(s) 605a or 605b and via network(s) 610, or the like) indicating a user request for a first media content. The computing system 625 (or server 615a or 615b) might autonomously determine one or more first characteristics of a plurality of characteristics of a first playback device (i.e., at least one of the one or more display devices 630a-630n or the one or more audio playback devices 635a-635n, or the like). The computing system 625 (or server 615a or 615b) might subsequently send, to the media content source(s) 645 over network 610, a first request for the first media content, the first request comprising information regarding one or more first presentation characteristics that are based at least in part on the determined one or more first characteristics of the first playback device. The computing system 625 (or server 615a or 615b) might receive a first version of the first media content, the first version of the first media content having the one or more first presentation characteristics, and might relay the received first version of the first media content to the first playback device for presentation to the user of the first version of the first media content.

According to some embodiments, the one or more first characteristics might comprise at least one of video resolution, dynamic range, frame rate, or color gamut, and/or the like. In some cases, the video resolution might comprise one of 8K ultra-high-definition ("UHD"), 4K UHD, 1080 p full high-definition ("HD"), 1080 i full HDi, '720 p HD, 576 p enhanced-definition ("ED"), 480 p ED, 576 i standard-definition ("SD"), or 480 i SD, and/or the like. The dynamic range might comprise one of high-dynamic-range ("HDR"), or standard-dynamic-range ("SDR"), and/or the like. The frame rate might comprise at least one of standard frame rate ("SFR") or high frame rate ("HFR"), and/or the like. The color gamut might comprise one of standard color gamut ("SCG") or wide color gamut ("WCG"), and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, with a computing system, a first user input from a user indicating a user request for a first media content;

autonomously determining, with the computing system, one or more first characteristics of a plurality of characteristics of a first playback device, wherein the one or more first characteristics comprise dynamic range;

sending, with the computing system and to a media content source over a network, a first request for the first media content, the first request comprising information regarding one or more first presentation characteristics that are based at least in part on the determined one or more first characteristics of the first playback device;

receiving, with the computing system, a first version of the first media content, the first version of the first media content having the one or more first presentation characteristics;

relaying, with the computing system, the received first version of the first media content to the first playback device for presentation to the user of the first version of the first media content;

detecting, with the computing system, that the first playback device has been disconnected prior to presentation to the user of an entirety of the first media content and detecting a second playback device that is different from the first playback device has been connected; and based on a determination that the first playback device has been disconnected prior to presentation to the user of an entirety of the first media content and based on a determination that the second playback device that is different from the first playback device has been connected, autonomously determining, with the computing system, one or more second characteristics of a plurality of characteristics of the second playback device and relaying, with the computing system, a second version of the first media content having one or more second presentation characteristics associated with the second playback device for presentation to the user.

2. The method of claim 1, wherein the computing system comprises a media device that is communicatively coupled to the first playback device.

3. The method of claim 2, wherein the media device comprises one of a set-top box ("STB"), a media player, a gaming console, a server computer, a desktop computer, or a laptop computer, wherein the media player comprises one of a digital versatile disc or digital video disc ("DVD") player, a Blu-ray disc ("BD") player, a streaming video player, a streaming music player, or a streaming game player, wherein the first playback device comprises at least one of one or more monitors, one or more television sets, or one or more speakers.

4. The method of claim 1, wherein the computing system and the first playback device are integrated within a single device, the single device comprising one of a tablet computer, a laptop computer, a smart phone, a mobile phone, a personal digital assistant, a portable gaming device, a smart watch, a virtual reality ("VR") device, an augmented reality ("AR") device, or a portable music player.

5. The method of claim 1, wherein the one or more first characteristics further comprise at least one of video resolution, frame rate, or color gamut.

6. The method of claim 5, wherein the video resolution comprises one of 8K ultra-high-definition ("UHD"), 4K UHD, 1080p full high-definition ("HD"), 1080i full HDi, 720p HD, 576p enhanced-definition ("ED"), 480p ED, 576i standard-definition ("SD"), or 480i SD, wherein the dynamic range comprises one of high-dynamic-range ("HDR"), or standard-dynamic-range ("SDR"), wherein the frame rate comprises at least one of standard frame rate ("SFR") or high frame rate ("HFR"), and wherein the color gamut comprises one of standard color gamut ("SCG") or wide color gamut ("WCG").

7. The method of claim 1, further comprising:
autonomously determining, with the computing system, one or more third characteristics of the plurality of characteristics of the first playback device, the one or more third characteristics comprising at least one of device manufacturer, model number, or specific firmware revision information, wherein the information regarding the one or more first presentation characteristics comprised in the first request is based at least in part on a combination of the determined one or more first characteristics of the first playback device and the determined one or more third characteristics of the first playback device.

8. The method of claim 1, further comprising:
storing, with the computing system, the determined one or more first characteristics of the first playback device on a local data storage device;
receiving, with the computing system, a second user input from the user indicating a user request for a second media content;
autonomously determining, with the computing system, whether the first playback device has been disconnected since its most recent usage;
based on a determination that the first playback device has been disconnected since its most recent usage and based on a determination that a third playback device has been connected, determining, with the computing system, whether the third playback device and the first playback device are the same device; and
based on a determination that the third playback device and the first playback device are the same device:
retrieving, with the computing system, the determined one or more first characteristics of the first playback device from the local data storage device;
sending, with the computing system and to the media content source over the network, a second request for the second media content, the second request comprising information regarding one or more first presentation characteristics that are based at least in part on the determined one or more first characteristics of the first playback device;
receiving, with the computing system, a second version of the second media content, the second version of the second media content having the one or more first presentation characteristics; and
relaying, with the computing system, the received second version of the second media content to the first playback device for presentation to the user of the second version of the second media content.

9. The method of claim 8, further comprising:
based on a determination that the second playback device and the third playback device are different devices, determining, with the computing system, whether one or more fourth characteristics of the third playback device are already stored on the local data storage device; and
based on a determination that one or more fourth characteristics of the third playback device are already stored on the local data storage device:
retrieving, with the computing system, the determined one or more fourth characteristics of the third playback device from the local data storage device;
sending, with the computing system and to the media content source over the network, a third request for the second media content, the third request comprising information regarding one or more third presentation characteristics that are based at least in part on the determined one or more fourth characteristics of the third playback device;
receiving, with the computing system, a third version of the second media content, the third version of the second media content having the one or more third presentation characteristics; and
relaying, with the computing system, the received third version of the second media content to the third playback device for presentation to the user of the third version of the second media content.

10. The method of claim 9, further comprising:
based on a determination that characteristics of the second playback device are not already stored on the local data storage device:
autonomously determining, with the computing system, one or more fifth characteristics of the third playback device;
sending, with the computing system and to the media content source over the network, a fourth request for the second media content, the fourth request comprising information regarding one or more fourth presentation characteristics that are based at least in part on the determined one or more fifth characteristics of the third playback device;

receiving, with the computing system, a fourth version of the second media content, the fourth version of the second media content having the one or more fourth presentation characteristics; and relaying, with the computing system, the received fourth version of the second media content to the third playback device for presentation to the user of the fourth version of the second media content.

11. The method of claim 1, wherein autonomously determining the one or more first characteristics of the first playback device comprises autonomously determining, with the computing system, the one or more first characteristics of the plurality of characteristics of the first playback device from the first playback device via an interface device between the computing system and the first playback device.

12. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
  receive a first user input from a user indicating a user request for a first media content;
  autonomously determine one or more first characteristics of a plurality of characteristics of a first playback device, wherein the one or more first characteristics comprise dynamic range;
  send, to a media content source over a network, a first request for the first media content, the first request comprising information regarding one or more first presentation characteristics that are based at least in part on the determined one or more first characteristics of the first playback device;
  receive a first version of the first media content, the first version of the first media content having the one or more first presentation characteristics;
  relay the received first version of the first media content to the first playback device for presentation to the user of the first version of the first media content;
  detect that the first playback device has been disconnected prior to presentation to the user of an entirety of the first media content and detect a second playback device that is different from the first playback device has been connected; and
  based on a determination that the first playback device has been disconnected prior to presentation to the user of an entirety of the first media content and based on a determination that the second playback device that is different from the first playback device has been connected, autonomously determine one or more second characteristics of a plurality of characteristics of the second playback device and relay a second version of the first media content having one or more second presentation characteristics associated with the second playback device for presentation to the user.

13. The apparatus of claim 12, wherein the apparatus comprises a media device that is communicatively coupled to the first playback device.

14. The apparatus of claim 13, wherein the media device comprises one of a set-top box ("STB"), a media player, a gaming console, a server computer, a desktop computer, or a laptop computer, wherein the media player comprises one of a digital versatile disc or digital video disc ("DVD") player, a Blu-ray disc ("BD") player, a streaming video player, a streaming music player, or a streaming game player, wherein the first playback device comprises at least one of one or more monitors, one or more television sets, or one or more speakers.

15. The apparatus of claim 12, wherein the apparatus comprises the playback device, wherein the apparatus comprises one of a tablet computer, a laptop computer, a smart phone, a mobile phone, a personal digital assistant, a portable gaming device, a smart watch, a virtual reality ("VR") device, an augmented reality ("AR") device, or a portable music player.

16. The apparatus of claim 12, wherein the one or more first characteristics further comprise at least one of video resolution, frame rate, or color gamut.

17. The apparatus of claim 16, wherein the video resolution comprises one of 8K ultra-high-definition ("UHD"), 4K UHD, 1080p full high-definition ("HD"), 1080i full HDi, 720p HD, 576p enhanced-definition ("ED"), 480p ED, 576i standard-definition ("SD"), or 480i SD, wherein the dynamic range comprises one of high-dynamic-range ("HDR"), or standard-dynamic-range ("SDR"), wherein the frame rate comprises at least one of standard frame rate ("SFR") or high frame rate ("HFR"), and wherein the color gamut comprises one of standard color gamut ("SCG") or wide color gamut ("WCG").

18. The apparatus of claim 12, wherein the set of instructions, when executed by the at least one processor, further causes the apparatus to:
  autonomously determine one or more third characteristics of the plurality of characteristics of the first playback device, the one or more third characteristics comprising at least one of device manufacturer, model number, or specific firmware revision information, wherein the information regarding the one or more first presentation characteristics comprised in the first request is based at least in part on a combination of the determined one or more first characteristics of the first playback device and the determined one or more third characteristics of the first playback device.

19. The apparatus of claim 12, wherein the set of instructions, when executed by the at least one processor, further causes the apparatus to:
  store the determined one or more first characteristics of the first playback device on a local data storage device;
  receive a second user input from the user indicating a user request for a second media content;
  autonomously determine whether the first playback device has been disconnected since its most recent usage;
  based on a determination that the first playback device has been disconnected since its most recent usage and based on a determination that a third playback device has been connected, determine whether the third playback device and the first playback device are the same device; and
  based on a determination that the third playback device and the first playback device are the same device:
    retrieve the determined one or more first characteristics of the first playback device from the local data storage device;
    send, to the media content source over the network, a second request for the second media content, the second request comprising information regarding one or more first presentation characteristics that are based at least in part on the determined one or more first characteristics of the first playback device;
receive a second version of the second media content, the second version of the second media content having the one or more first presentation characteristics; and
relay the received second version of the second media content to the first playback device for presentation to the user of the second version of the second media content.

20. The apparatus of claim 19, wherein the set of instructions, when executed by the at least one processor, further causes the apparatus to:
based on a determination that the third playback device and the first playback device are different devices, determine whether one or more fourth characteristics of the third playback device are already stored on the local data storage device; and
based on a determination that one or more fourth characteristics of the third playback device are already stored on the local data storage device:
retrieve the determined one or more fourth characteristics of the third playback device from the local data storage device;
send, to the media content source over the network, a third request for the second media content, the third request comprising information regarding one or more third presentation characteristics that are based at least in part on the determined one or more fourth characteristics of the third playback device;
receive a third version of the second media content, the third version of the second media content having the one or more third presentation characteristics; and
relay the received third version of the second media content to the third playback device for presentation to the user of the third version of the second media content.

21. The apparatus of claim 20, wherein the set of instructions, when executed by the at least one processor, further causes the apparatus to:
based on a determination that characteristics of the third playback device are not already stored on the local data storage device:
autonomously determine one or more fifth characteristics of the third playback device;
send, to the media content source over the network, a fourth request for the second media content, the fourth request comprising information regarding one or more fourth presentation characteristics that are based at least in part on the determined one or more fifth characteristics of the third playback device;
receive a fourth version of the second media content, the fourth version of the second media content having the one or more fourth presentation characteristics; and
relay the received fourth version of the second media content to the third playback device for presentation to the user of the fourth version of the second media content.

22. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a first user input from a user indicating a user request for a first media content;
autonomously determine one or more first characteristics of a plurality of characteristics of a first playback device, wherein the one or more first characteristics comprise dynamic range;
send, to a media content source over a network, a first request for the first media content, the first request comprising information regarding one or more first presentation characteristics that are based at least in part on the determined one or more first characteristics of the first playback device;
receive a first version of the first media content, the first version of the first media content having the one or more first presentation characteristics; and
relay the received first version of the first media content to the first playback device for presentation to the user of the first version of the first media content;
detect that the first playback device has been disconnected prior to presentation to the user of an entirety of the first media content and detect a second playback device that is different from the first playback device has been connected; and
based on a determination that the first playback device has been disconnected prior to presentation to the user of an entirety of the first media content and based on a determination that the second playback device that is different from the first playback device has been connected, autonomously determine one or more second characteristics of a plurality of characteristics of the second playback device and relay a second version of the first media content having one or more second presentation characteristics associated with the second playback device for presentation to the user;
the first playback device, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the first playback device to:
receive the first version of the first media content relayed from the computing system; and
present the first version of the first media content to the user; and
the second playback device, comprising:
at least one third processor; and
a third non-transitory computer readable medium communicatively coupled to the at least one third processor, the third non-transitory computer readable medium having stored thereon computer software comprising a third set of instructions that, when executed by the at least one third processor, causes the second playback device to:
receive the second version of the first media content relayed from the computing system; and
present the second version of the first media content to the user.

23. The system of claim 22, wherein the computing system comprises a media device that is communicatively coupled to the first playback device, wherein the media device comprises one of a set-top box ("STB"), a media player, a gaming console, a server computer, a desktop computer, or a laptop computer, wherein the media player comprises one of a digital versatile disc or digital video disc ("DVD") player, a Blu-ray disc ("BD") player, a streaming video player, a streaming music player, or a streaming game player, wherein the first playback device comprises at least one of one or more monitors, one or more television sets, or one or more speakers.

24. The system of claim 22, wherein the computing system and the first playback device are integrated within a single device, the single device comprising one of a tablet computer, a laptop computer, a smart phone, a mobile phone, a personal digital assistant, a portable gaming device, a smart watch, a virtual reality ("VR") device, an augmented reality ("AR") device, or a portable music player.

25. The system of claim 22, wherein the one or more first characteristics further comprise at least one of video resolution, frame rate, or color gamut.

26. The system of claim 25, wherein the video resolution comprises one of 8K ultra-high-definition ("UHD"), 4K UHD, 1080p full high-definition ("HD"), 1080i full HDi, 720p HD, 576p enhanced-definition ("ED"), 480p ED, 576i standard-definition ("SD"), or 480i SD, wherein the dynamic range comprises one of high-dynamic-range ("HDR"), or standard-dynamic-range ("SDR"), wherein the frame rate comprises at least one of standard frame rate ("SFR") or high frame rate ("HFR"), and wherein the color gamut comprises one of standard color gamut ("SCG") or wide color gamut ("WCG").

27. The system of claim 22, wherein autonomously determining the one or more first characteristics of the first playback device comprises autonomously determining the one or more first characteristics of the plurality of characteristics of the first playback device from the first playback device via an interface device between the computing system and the first playback device.

* * * * *